United States Patent
Cheong et al.

(10) Patent No.: US 12,273,188 B2
(45) Date of Patent: Apr. 8, 2025

(54) ELECTRONIC DEVICE FOR TRANSMITTING AND RECEIVING DATA PACKET AND OPERATING METHOD THEREOF

(71) Applicant: SAMSUNG ELECTRONICS CO., LTD., Suwon-si (KR)

(72) Inventors: Gupil Cheong, Suwon-si (KR); Kyusang Ryu, Suwon-si (KR); Hyungseoung Yoo, Suwon-si (KR); Doosuk Kang, Suwon-si (KR); Kyungtae Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 279 days.

(21) Appl. No.: 17/951,648

(22) Filed: Sep. 23, 2022

(65) Prior Publication Data
US 2023/0100921 A1   Mar. 30, 2023

Related U.S. Application Data

(63) Continuation of application No. PCT/KR2022/012754, filed on Aug. 25, 2022.

(30) Foreign Application Priority Data

Sep. 24, 2021  (KR) .......................... 10-2021-0126208
Dec. 13, 2021  (KR) .......................... 10-2021-0177521
Jul. 6, 2022   (KR) .......................... 10-2021-0083207

(51) Int. Cl.
*H04L 1/00*    (2006.01)
*G10L 19/16*   (2013.01)
(Continued)

(52) U.S. Cl.
CPC .......... *H04L 1/0011* (2013.01); *G10L 19/167* (2013.01); *H04L 1/16* (2013.01); *H04W 76/10* (2018.02)

(58) Field of Classification Search
None
See application file for complete search history.

(56) References Cited

U.S. PATENT DOCUMENTS 7,020,119 B2 *  3/2006  Goodings ............. H04M 1/725
                                                  714/48
8,135,344 B2 *  3/2012  Krueger ................. H04L 65/75
                                                  370/320
(Continued)

FOREIGN PATENT DOCUMENTS

CN   112640505 A   4/2021
CN   112789883 A   5/2021
(Continued)

OTHER PUBLICATIONS

The extended European search report for EP Application No. 22873115.4 mailed on Sep. 23, 2024.
(Continued)

*Primary Examiner* — Tuan A Tran
(74) *Attorney, Agent, or Firm* — CANTOR COLBURN LLP

(57) ABSTRACT

According to various embodiments, an electronic device includes a communication circuit for supporting a Bluetooth™ communication, and at least one processor functionally connected to the communication circuit. The at least one processor is configured to establish, via the communication circuit, a Bluetooth™ low energy (BLE) communication link with an external electronic device, to generate a first data packet from first audio data using a first coding scheme, and generate a second data packet from first audio data using a second coding scheme, and through the BLE
(Continued)

communication link, to transmit the first data packet to the external electronic device in a first time interval of a predetermined time interval, and transmit the second data packet to the external electronic device in a second time interval of the predetermined time interval.

20 Claims, 34 Drawing Sheets

(51) Int. Cl.
*H04L 1/16* (2023.01)
*H04L 29/06* (2006.01)
*H04W 4/80* (2018.01)
*H04W 72/12* (2023.01)
*H04W 76/10* (2018.01)

(56) References Cited

U.S. PATENT DOCUMENTS

| | | | | |
|---|---|---|---|---|
| 8,769,370 | B2 * | 7/2014 | Murakami | H03M 13/1154 |
| | | | | 714/701 |
| 8,817,740 | B2 * | 8/2014 | Russell | H04L 47/10 |
| | | | | 370/338 |
| 9,680,533 | B2 * | 6/2017 | Gudan | H04B 7/0617 |
| 10,701,656 | B2 * | 6/2020 | Gentili | H04W 56/0015 |
| 11,405,578 | B2 * | 8/2022 | Siddalinga | H04N 5/62 |
| 11,582,696 | B2 * | 2/2023 | Kumar | H04W 74/06 |
| 11,638,172 | B2 * | 4/2023 | Jung | H04W 24/08 |
| | | | | 370/252 |
| 11,910,289 | B2 * | 2/2024 | Arunachalam | H04R 3/12 |
| 12,010,496 | B2 * | 6/2024 | Kumar | H04W 4/80 |
| 12,120,164 | B2 * | 10/2024 | Krovvidi | H04L 65/61 |
| 2014/0188465 | A1 | 7/2014 | Choo et al. | |
| 2015/0334488 | A1 | 11/2015 | Kim et al. | |
| 2017/0011754 | A1 | 1/2017 | Choo et al. | |
| 2020/0044769 | A1 * | 2/2020 | Neelisetty | H04W 4/80 |
| 2020/0265854 | A1 | 8/2020 | Moon et al. | |
| 2020/0374030 | A1 | 11/2020 | Liu et al. | |
| 2021/0243402 | A1 | 8/2021 | Siddalinga et al. | |
| 2022/0103948 | A1 * | 3/2022 | Kumar | H04R 5/04 |
| 2022/0263883 | A1 | 8/2022 | Lee | |
| 2022/0329998 | A1 * | 10/2022 | Arunachalam | H04L 67/1044 |

FOREIGN PATENT DOCUMENTS

| | | |
|---|---|---|
| KR | 20150087226 A | 7/2015 |
| KR | 20160125397 A | 10/2016 |
| KR | 20180108310 A | 10/2018 |
| KR | 20200101012 A | 8/2020 |
| KR | 20200119301 A | 10/2020 |
| KR | 102282103 B1 | 7/2021 |
| KR | 20210086517 A | 7/2021 |
| WO | 2020/133112 A1 | 7/2020 |
| WO | 2021015484 A1 | 1/2021 |

OTHER PUBLICATIONS

International Search Report mailed Nov. 29, 2022 for PCT/KR2022/012754.

* cited by examiner

ELECTRONIC DEVICE FOR TRANSMITTING AND RECEIVING DATA PACKET AND OPERATING METHOD THEREOF

CROSS-REFERENCE TO RELATED APPLICATION(S)

This application is based on and claims priority under 35 U.S.C. § 120 to PCT International Application No. PCT/KR2022/012754, which was filed on Aug. 25, 2022, and claims priority to Korean Patent Applications No. 10-2021-0126208, filed on Sep. 24, 2021, No. 10-2021-0177521, filed on Dec. 13, 2021, and No. 10-2022-0083207, filed on Jul. 6, 2022, in the Korean Intellectual Property Office, the disclosures of which are incorporated by reference herein their entirety.

BACKGROUND

1. Field

Various embodiments relate to an electronic device for transmitting and receiving a data packet and an operating method thereof.

2. Description of Related Art

A Bluetooth™ communication technology may support a short-range wireless communication which enables electronic devices to be connected to each other for exchanging data or information. The Bluetooth™ communication technology may include a Bluetooth™ legacy (or classic) communication technology or a Bluetooth™ low energy (BLE) communication technology.

In a communication using the Bluetooth™ legacy communication technology, an electronic device may transmit and receive a data packet to and from an external electronic device by using various physical layers (PHYs) such as, for example, low energy (LE) 2M, LE 1M, Coded S=2, or coded S=8. The electronic device may select the most efficient PHY from among the various PHYs at a time of transmitting and receiving the data packet to and from the external electronic device, thereby increasing a communication success rate, minimizing power consumption, and securing efficiency of a communication link.

In a Bluetooth™ legacy communication technology, even if an electronic device transmitting data packets transmits the data packets to an external electronic device by changing a packet type to one packet type arbitrarily selected from among a plurality of packet types in order to respond to a changed wireless environment while transmitting the data packets, preambles and headers of all of the data packets are the same, so the external electronic device may receive the data packets of the changed packet type.

Unlike the Bluetooth™ legacy communication technology, in a BLE communication technology, a preamble is different for each PHY, so if an electronic device transmitting data packets arbitrarily changes a PHY without prior notice to an external electronic device receiving the data packets, the external electronic device may not normally receive the data packets transmitted with the changed PHY. Therefore, if the electronic device intends to change the PHY while transmitting the data packets to the external electronic device using the BLE communication technology, the electronic device needs to change the PHY after checking, with the external electronic device using a message of a link layer, whether a change in the PHY is possible and the PHY is to be changed at which point, so a delay for changing the PHY may occur.

In the BLE communication technology, in order to respond to a change in a wireless environment in a state in which the PHY is fixed, it is possible to increase transmission power or increase reception sensitivity. However, there is no method to increase a communication success rate in a state in which a data communication is performed with maximum transmit power and maximum reception sensitivity, so communication quality degradation due to a real-time change in the wireless environment may occur.

According to various embodiments, there may be provided a device and method for transmitting and receiving a data packet which may increase a packet transmission/reception success rate and secure quality of a communication link by rapidly responding to a change in a wireless environment in real time for data packet transmission and reception using a Bluetooth™ communication technology.

SUMMARY

According to various embodiments, an electronic device includes a communication circuit configured to support a Bluetooth™ communication, and at least one processor functionally connected to the communication circuit. The at least one processor is configured to establish, via the communication circuit, a Bluetooth™ low energy (BLE) communication link with an external electronic device, generate a first data packet from first audio data using a first coding scheme, generate a second data packet from the first audio data using a second coding scheme, and through the BLE communication link, transmit the first data packet to the external electronic device in a first time interval of a predetermined time interval, and transmit the second data packet to the external electronic device in a second time interval after the first time interval of the predetermined time interval.

According to various embodiments, an electronic device includes a communication circuit configured to support a Bluetooth™ communication, and at least one processor functionally connected to the communication circuit. The at least one processor is configured to establish, via the communication circuit, a Bluetooth™ low energy (BLE) communication link with an external electronic device, and through the BLE communication link, receive a first data packet from the external electronic device in a first time interval of a predetermined time interval, and receive a second data packet from the external electronic device in a second time interval of the predetermined time interval. The first data packet is generated from first audio data using a first coding scheme, and the second data packet is generated from the first audio data using a second coding scheme.

According to various embodiments, an operating method in an electronic device includes: establishing, via a communication circuit, a Bluetooth™ low energy (BLE) communication link with an external electronic device; generating a first data packet from first audio data using a first coding scheme; generating a second data packet from the first audio data using a second coding scheme; and through the BLE communication link, transmitting the first data packet to the external electronic device in a first time interval of a predetermined time interval, and transmitting the second data packet to the external electronic device in a second time interval after the first time interval of the predetermined time interval.

According to various embodiments, an operating method in an electronic device includes: establishing, via the communication circuit, a Bluetooth™ low energy (BLE) communication link with an external electronic device; and through the BLE communication link, receiving a first data packet from the external electronic device in a first time interval of a predetermined time interval, and receiving a second data packet from the external electronic device in a second time interval after the first time interval of the predetermined time interval. The first data packet is generated from first audio data using a first coding scheme, and the second data packet is generated from the first audio data using a second coding scheme.

According to various embodiments, an electronic device may actively respond to a change in a wireless environment by generating and transmitting two or more encoded data packets for the same data when transmitting a data packet to an external electronic device. According to various embodiments, an electronic device may generate and transmit two or more encoded data packets for the same data, thereby effectively increasing a data packet reception probability of an external electronic device.

MODE FOR INVENTION

Figure 1:
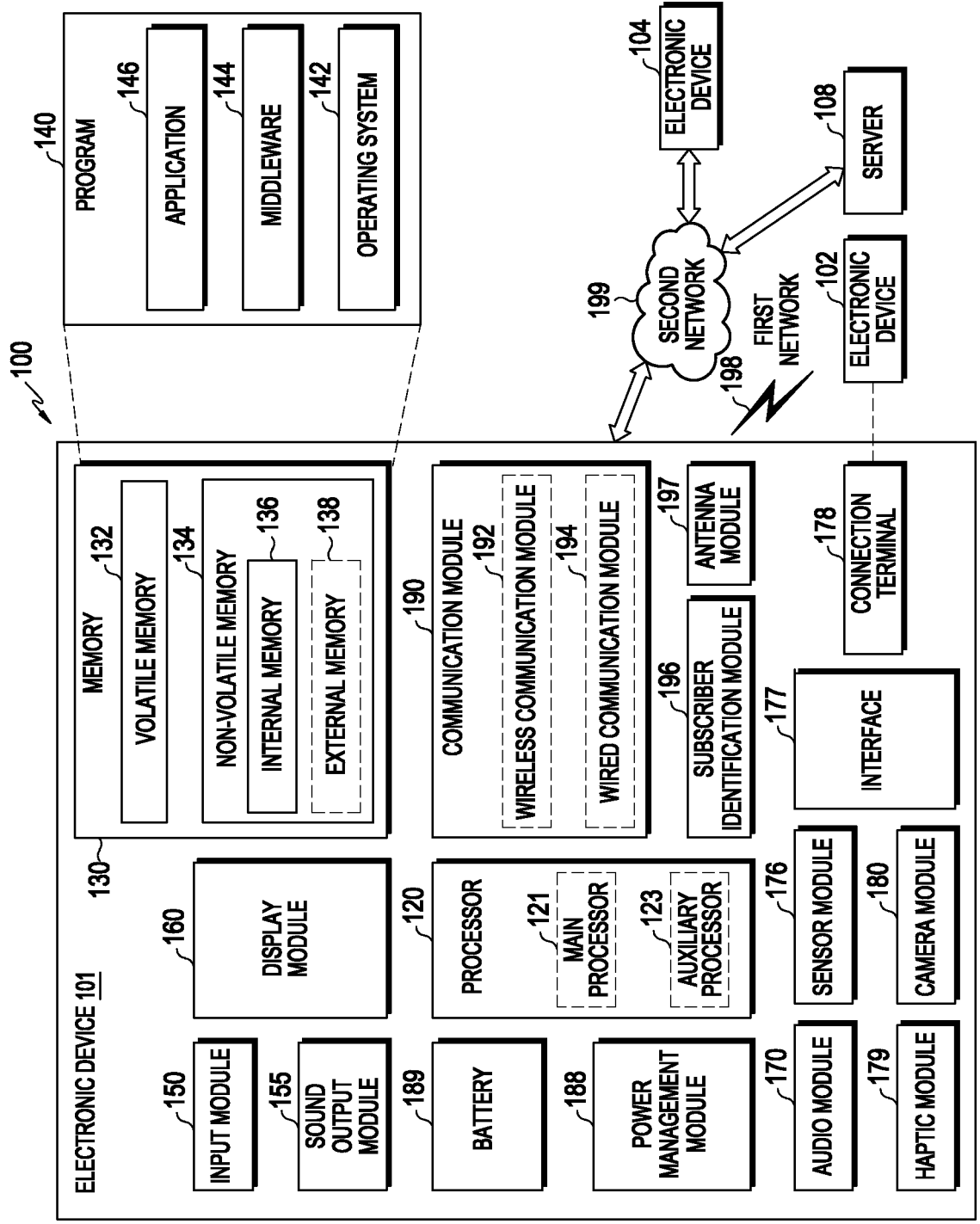
FIG. 1 is a block diagram of an electronic device in a network environment according to various embodiments.

Hereinafter, various embodiments of the disclosure will be described in detail with reference to the accompanying drawings. In the following description of various embodiments of the disclosure, a detailed description of relevant known functions or configurations incorporated herein will be omitted when it is determined that the description may make the subject matter of various embodiments of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described in detail with reference to the accompanying drawings. Regardless of drawing signs, the same or like elements are provided with the same reference numeral, and a repeated description thereof will be omitted. Alternatively, in describing various embodiments of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in various embodiments of the disclosure, but the terminal may be referred to as an electronic device, a mobile station, a mobile equipment (ME), a user equipment (UE), a user terminal (UT), a subscriber station (SS), a wireless device, a handheld device, and an access terminal (AT). Alternatively, in various embodiments of the disclosure, the terminal may be a device having a communication function such as, for example, a mobile phone, a personal digital assistant (PDA), a smart phone, a wireless MODEM, and a notebook.

In a detailed description of various embodiments of the disclosure, a Bluetooth™ wireless communication technology is referred to, but the main subject of the disclosure can be somewhat modified and applied to other communication systems having a similar technical background without departing from the scope of the disclosure, and the modifications can be made on the basis of determination of those skilled in the art.

FIG. 1 is a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (WiFi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
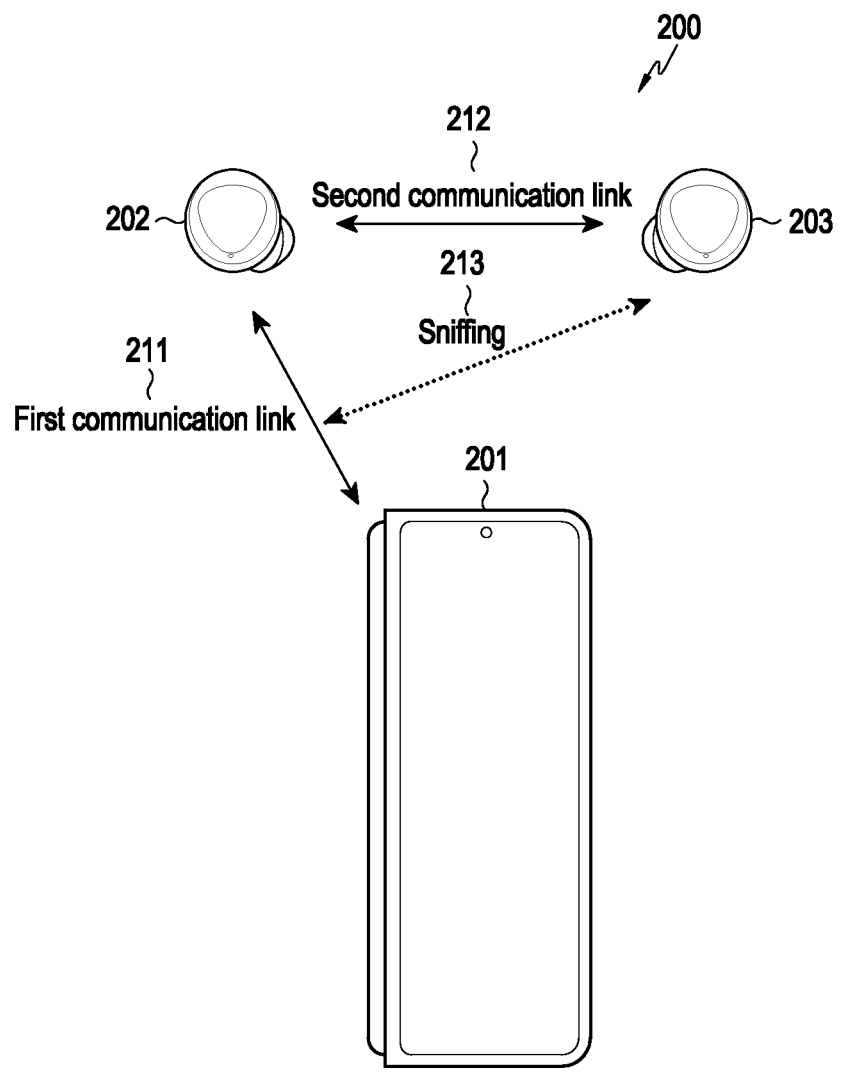
FIG. 2 is a diagram illustrating electronic devices according to various embodiments.

FIG. 2 is a diagram for describing an example of a connection between an electronic device and an external electronic device according to various embodiments.

Referring to FIG. 2, an electronic device 201 (e.g., an electronic device 101 in FIG. 1) may be wirelessly connected to external electronic devices 202 and 203 (e.g., an external electronic device 102 in FIG. 1). The electronic device 201 (e.g., the electronic device 101) may include a smart phone as shown in FIG. 2, and may be implemented with various types of devices (e.g., a notebook computer including a standard notebook computer, a ultrabook, a netbook, and a tabbook, a laptop computer, a tablet computer, and a desktop computer) without being limited to what is written and/or illustrated. The electronic device 201 (e.g., the electronic device 101) may be implemented as described in FIG. 1, and accordingly may include components (e.g., various modules) illustrated in FIG. 1.

According to an embodiment, the external electronic devices 202 and 203 may be implemented as wireless earbuds as illustrated in FIG. 2. In an embodiment, if the external electronic devices 202 and 203 are the wireless earbuds, the external electronic devices 202 and 203 may include a pair of devices (e.g., a first earbud 202 and a second earbud 203). According to an embodiment, the pair of devices (e.g., the first earbud 202 and the second earbud 204) may be implemented to include the same or similar components.

According to various embodiments, the electronic device 201 and the external electronic devices 202 and 203 may establish communication links among one another, and may transmit and/or receive data among one another. For example, the electronic device 201 and each of the external electronic devices 202 and 203 may establish a communication link between each other by using a Bluetooth™ legacy (or classic) communication and/or Bluetooth™ low energy (BLE) communication technology (e.g., by using a communication circuit which supports a corresponding communication scheme).

In an embodiment, if the external electronic devices 202 and 203 are the wireless earbuds, the electronic device 201 may establish a first communication link 211 with only the first earbud 202 which is a master earbud of the pair of devices (e.g., the first earbud 202 and the second earbud 203), and may also establish communication links with all of the pair of devices (e.g., the first earbud 202 and the second earbud 203) without being limited to what is written.

According to various embodiments, if the external electronic devices 202 and 203 are the wireless earbuds, the pair of devices (e.g., the first earbud 202 and the second earbud 203) may establish a second communication link 212 between each other, and transmit and/or receive a data packet (e.g., an audio data packet and/or control data packet) between each other. As described above, the pair of devices may establish the second communication link 212 between each other by using Bluetooth™ legacy (or classic) communication and/or Bluetooth™ low energy (BLE) communication technology (e.g., by using a communication circuit which supports a corresponding communication).

In an embodiment, one device of the pair of devices (e.g., the first earbud 202 and the second earbud 203) may be a master device (or a primary device or a main device), another device may be a slave device (or a secondary device), and the master device (or the main device) may transmit data to the slave device. For example, when the pair of devices (e.g., the first earbud 202 and the second earbud 203) establish the second communication link 212 between each other, the one device of the pair of devices (e.g., the first earbud 202 and the second earbud 203) may be randomly selected as the master device, and the other device may be randomly selected as the slave device.

For example, when the pair of devices (e.g., the first earbud 202 and the second earbud 203) establish a communication link between each other, a device whose wear is first detected (e.g., whose value indicating wear is detected using a sensor (e.g., a proximity sensor, a touch sensor, a tilt 6-axis sensor, and a 9-axis sensor) for detecting the wear) may be selected as the master device and a remaining device may be selected as the salve device. In an embodiment, the master device may transmit, to the slave device, data received from the electronic device 201. For example, the first earbud 202 as the master device not only may output audio to a speaker based on audio data received from the electronic device 201, but also may transmit the audio data to the second earbud 204 as the slave device. In an embodiment, the slave device may receive audio data transmitted from the electronic device 201 to the master device through sniffing 213 based on connection information provided from the master device.

Figure 3:
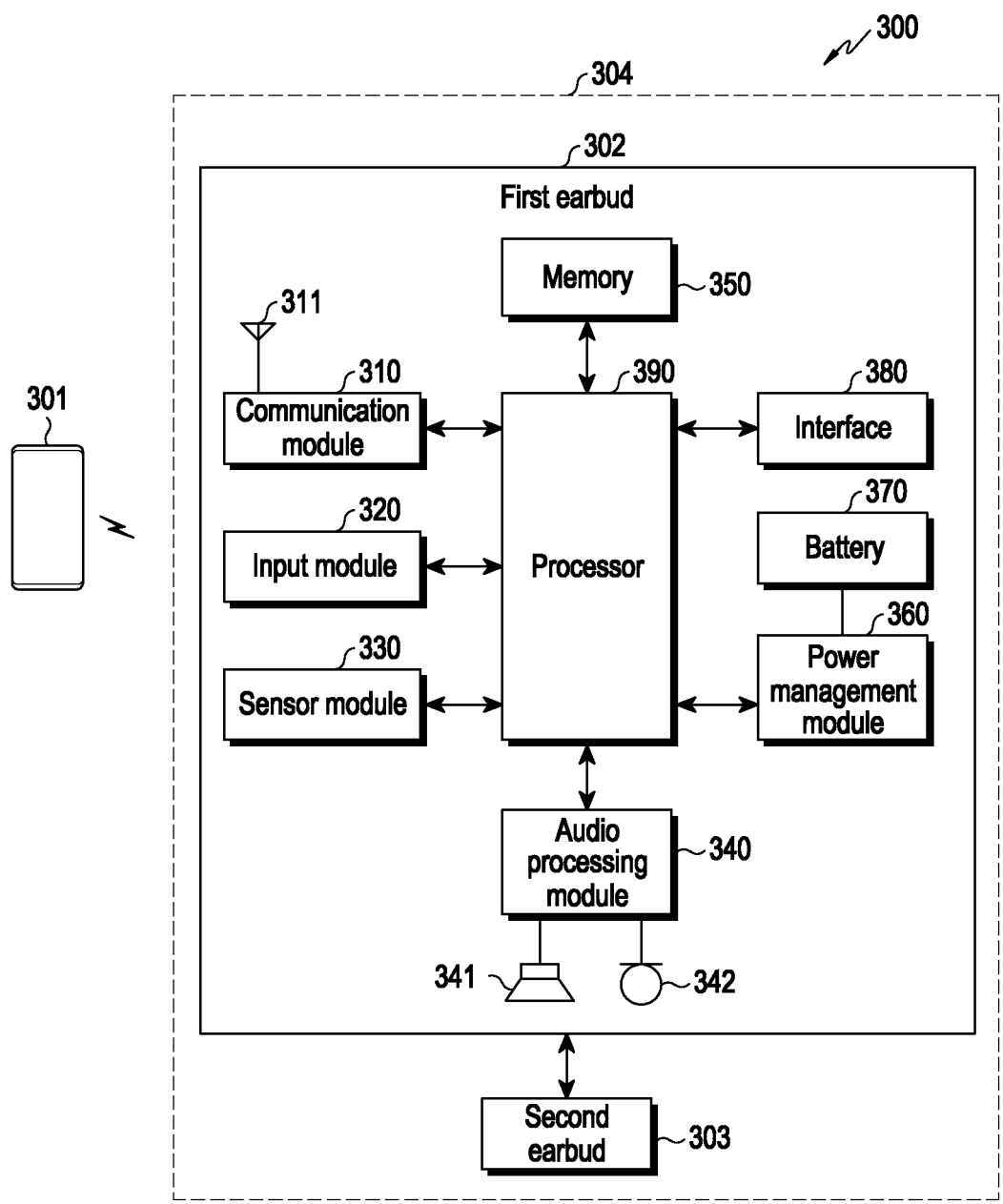
FIG. 3 is a block diagram of an external electronic device according to various embodiments.

FIG. 3 is a block diagram 300 of an external electronic device according to various embodiments.

Referring to FIG. 3, an external electronic device 304 may include a first earbud 302 and a second earbud 303, and the first earbud 302 and the second earbud 303 may be true wireless stereo (TWS) devices (e.g., earbud devices) which are composed as a pair. For example, the first earbud 302 may be one of a left earbud device and a right earbud device, and the second earbud 303 may be another one of the left earbud device and the right earbud device. In an embodiment, the first earbud 302 may be a master earbud which may be connected to an electronic device 301 (e.g., an electronic device 101 in FIG. 1), and the second earbud 303 may be a slave earbud which may be connected to the master earbud.

According to various embodiments, the first earbud 302 may include an antenna module 311, a communication module 310, an input module 320, a sensor module 330, an audio processing module 340, a memory 350, a power management module 360, a battery 370, an interface 380, and a processor 390.

According to various embodiments, the communication module 310 may be a wireless communication module, and may include a module for a Bluetooth™ legacy (or classic) communication and/or Bluetooth™ low energy (BLE) communication. The communication module 310 may be operated independently of the processor 390 and may include one or more communication processors supporting a wireless communication. In various embodiments, the communication module 310 may be referred to as a communication interface or a communication circuit.

According to various embodiments, the communication module 310 may perform a communication with the second earbud 303 and/or the electronic device 301 (e.g., the electronic device 101 in FIG. 1 and an electronic device 201 in FIG. 2). For example, the communication module 310 may, through a communication link (e.g., a first communication link 211 in FIG. 2) established with the electronic device 301, receive a data packet from the electronic device 301, and transmit, to the electronic device 301, an acknowledgment (ACK) packet or a negative acknowledgment (NACK) packet as a response packet. According to an embodiment, the communication module 310 may receive a first encoded data packet encoded by a first coding scheme in a predetermined first time interval and receive a second encoded data packet encoded by a second coding scheme in a second time interval. According to still another embodiment, the communication module 310 may receive a data packet of a first type and a data packet of a second type different from the first type within one time interval. According to another embodiment, the communication module 310 may receive a first data packet having a first resolution and a second data packet having a second resolution within one time interval. The communication module 310 may receive, from the second earbud 303 through a communication link (e.g., a second communication link 212 in FIG. 2) established with the second earbud 303, packet synchronization information (e.g., identification information for a data packet and information indicating whether the data packet is received by a second electronic device), and transmit, to the electronic device 303 through a first communication link, an ACK packet or a NACK packet.

According to various embodiments, the antenna module 311 may transmit a packet or information to the second earbud 303 or the electronic device 301, or receive a packet or information from the second earbud 303 or the electronic device 301. According to an embodiment, the antenna module 311 may include a plurality of antennas. According to an embodiment, at least one antenna suitable for a communication scheme used in a communication network (e.g., a first network 198 in FIG. 1) may be selected from among the plurality of antennas by the communication module 310. A data packet, a response packet, or packet synchronization information may be transmitted or received between the communication module 310 and another electronic device (e.g., the second earbud 303 or the electronic device 301) via the selected at least one antenna.

According to various embodiments, the input module 320 may be configured to generate various input signals which may be used for an operation of the first electronic device 301. The input module 320 may include a touch pad, a touch panel, or a button. The touch pad may recognize a touch input with, for example, at least one of a capacitive scheme, a pressure sensitive scheme, an infrared scheme, or an ultrasonic scheme. If a capacitive touch pad is provided, physical contact or proximity recognition may be possible. The touch pad may further include a tactile layer. The touch pad including the tactile layer may provide a user with a tactile reaction. The button may include, for example, a physical button or an optical key.

According to various embodiments, the input module 320 may receive a user input associated with data (e.g., audio data or multimedia data). For example, the user input may be associated with a function of starting playback of data, pausing the playback, stopping the playback, adjusting a playback speed, adjusting a playback volume, or muting the data. An operation of the first earbud 302 may be controlled by various gestures such as swiping up and down or tapping a surface on which the touch pad is installed.

According to various embodiments, the sensor module 330 may identify a location or an operation state of the first earbud 302. The sensor module 330 may convert measured or identified information into an electrical signal. The sensor module 330 may include, for example, at least one of a magnetic sensor, an acceleration sensor, a gyro sensor, a geomagnetic sensor, a proximity sensor, a gesture sensor, a grip sensor, a biometric sensor, and an optical sensor. In an embodiment, the optical sensor may include a light emitting unit (e.g., a light emitting diode (LED)) which outputs light of at least one wavelength band. The optical sensor may include a light receiving unit (e.g., a photodiode) which receives light of one or more wavelength bands which is scattered or reflected from an object to generate an electrical signal.

According to various embodiments, the audio processing module 340 may support an audio data collection function and reproduce collected audio data. According to an embodiment, the audio processing module 340 may include an audio decoder (not shown) and a D/A converter (not shown). The audio decoder may convert audio data stored in the memory 350 or received from the electronic device 301 via the communication module 310 into a digital audio signal. The D/A converter may convert the digital audio signal converted by the audio decoder into an analog audio signal. According to various embodiments, the audio decoder may convert audio data received from the electronic device 301 via the communication module 310 and stored in the memory 350 into a digital audio signal. The speaker 341 may output the analog audio signal converted by the D/A converter. According to an embodiment, the audio processing module 340 may include an A/D converter (not shown). The A/D converter may convert an analog voice signal transferred via the microphone 342 into a digital voice signal.

According to various embodiments, the microphone 342 may include at least one air conduction microphone and/or at least one bone conduction microphone for detecting voice. The air conduction microphone may detect a voice (e.g., a user's utterance) transferred through air and output a voice signal corresponding to the detected voice. The bone conduction microphone may measure a vibration of the user's bone (e.g., a skull) due to the user's voice utterance to output a voice signal corresponding to the measured vibration. The bone conduction microphone may be referred to as a bone conduction sensor or other various names. A voice detected by the air conduction microphone is a voice mixed with an external noise while a user's utterance is transferred through air, whereas a voice detected by the bone conduction microphone is detected from a vibration of a bone, so an inflow of an external noise (e.g., an effect due to a noise) may be small. Accordingly, the bone conduction microphone may output a voice signal corresponding to a user's voice with reduced external noise even in a high-noise environment. According to various embodiments, a voice signal outputted from the microphone 342 may be transferred to the processor 390. According to an embodiment, the acceleration sensor (e.g., the sensor module 330) may be used to obtain a voice signal corresponding to a user's voice with a reduced external noise. For example, the acceleration sensor may measure a vibration of the user's skin due to the user's voice utterance to output a voice signal corresponding to the measured vibration to the processor 390. The voice (e.g., the vibration) detected by the acceleration sensor is detected from the vibration of the skin, so an inflow of an external noise (e.g., an effect due to a noise) may be small. The above-described bone conduction microphone and/or acceleration sensor may be referred to as a voice pickup unit (VPU), or may be referred to as various other names.

According to various embodiments, the audio processing module 340 may reproduce various audio data set in a working operation of the first earbud 302. For example, the processor 390 may be designed to sense, via the sensor module 330, that the first earbud 302 is coupled to or detached from the user's ear, and reproduce, via the audio processing module 340, audio data related to an effect sound or a guide sound. An output of the sound effect or guide sound may be omitted according to a user's setting or a designer's intention.

According to various embodiments, the memory 350 may store various data used by at least one component (e.g., the processor 390 or the sensor module 330) in the first earbud 301. Data may include, for example, input data or output data for software and a command related thereto. According to an embodiment, the data may include at least one of identification information for a data packet, information about whether the first earbud 302 has received the data packet, or information about whether the second earbud 303 has received the data packet. The memory 350 may include a volatile memory or a non-volatile memory.

According to various embodiments, the power management module 360 may manage power supplied to the first earbud 302. According to an embodiment, the power management module 360 may be implemented as, for example, at least a part of a power management integrated circuit (PMIC). According to an embodiment, the power management module 360 may include a battery charging module. According to an embodiment, if the electronic device 301 is electrically (wirelessly or wiredly) connected to the first earbud 302, the power management module 360 may receive power from the electronic device 301 to charge the battery 370.

According to various embodiments, the battery 370 may supply power to at least one component in the first earbud 302. According to an embodiment, the battery 370 may include, for example, a rechargeable battery.

According to various embodiments, the interface 380 may support one or more designated protocols which may be used for the first earbud 302 to be directly (e.g., through wire) connected to the electronic device 301, the second earbud 303, or another electronic device. According to an embodiment, the interface 380 may include, for example, a high-definition multimedia interface (HDMI), a USB interface, an SD card interface, or an audio interface. According to an embodiment, the interface 380 may include a connection port for forming a physical connection with the electronic device 301.

According to various embodiments, the processor 390 may, for example, run software to control at least one other component (e.g., a hardware or software component) in the first earbud 302 connected to the processor 390, and perform various data processing or computation. According to an embodiment, as at least a part of data processing or computation, the processor 390 may load a command or data received from another component (e.g., the sensor module 330 or the communication module 310) into the volatile memory 350, process a command or data stored in the volatile memory 350, and store resulting data in non-volatile memory.

According to an embodiment, the processor 390 may establish a first communication link with the electronic device 301 via the communication module 310, and receive a data packet from the electronic device 301 through the established first communication link. According to an embodiment, the processor 390 may detect data (e.g., audio data) from a data packet received from the electronic device 301, and process the detected data via the audio processing module 340 to output the processed data to the speaker 341.

According to an embodiment, the processor 390 may perform all or some of operations of external electronic devices 202 and 203 described in FIG. 2 and/or operations of an external electronic device to be described below.

According to various embodiments, the first earbud 302 may further include various modules according to a provision form thereof. There are many variations according to a convergence trend of a digital device, so it is not possible to enumerate all of the variations, but components equivalent to the above-mentioned components may be further included in the first earbud 302. Further, in the first earbud 302 according to an embodiment, certain components may be excluded from the above-mentioned components or replaced with other components according to a provision form thereof. This will be easily understood by those of ordinary skill in the art.

According to various embodiments, the second earbud 303 may be a device composed as a pair with the first earbud 302, and may include the same or similar components included in the first earbud 302. The second earbud 303 may perform all or some of the operations of the external electronic devices 202 and 203 described in FIG. 2 and/or operations of an external electronic device to be described later with reference to the drawings.

According to various embodiments, in addition to the second earbud 303, one or more electronic devices composed as a pair with the first earbud 302 may be further included. One or more earbud devices may also include the same or similar components included in the first earbud 302, and may perform all or some of the operations of the external electronic device to be described later with reference to the drawings.

Figure 4:
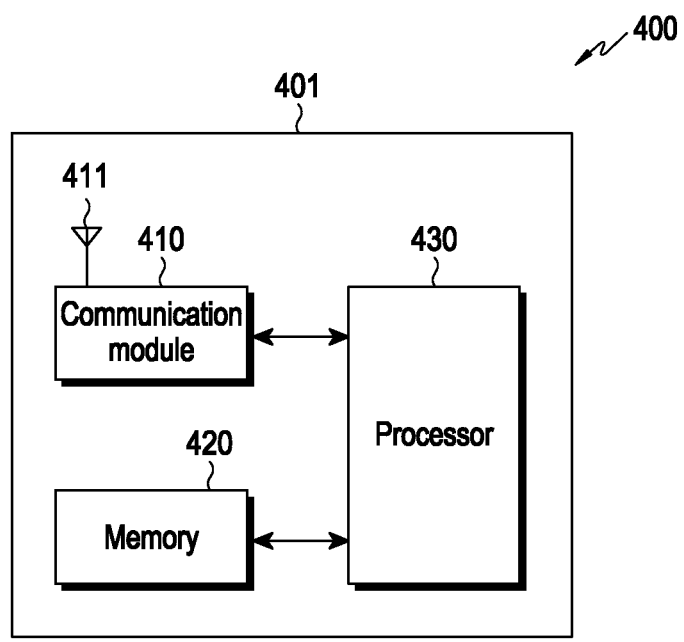
FIG. 4 is a block diagram of an electronic device according to various embodiments.

FIG. 4 is a block diagram 400 of an electronic device according to various embodiments.

According to various embodiments, an electronic device 401 may be an electronic device 101 in FIG. 1, an electronic device 201 in FIG. 2, and an electronic device 301 in FIG. 3. According to various embodiments, the electronic device 401 may include a component which is identical or similar to at least one of components (e.g., modules) of the electronic device 101 illustrated in FIG. 1.

Referring to FIG. 4, the electronic device 401 may include an antenna module 411 (e.g., an antenna module 197 in FIG. 1), a communication module 410 (e.g., a communication module 190 in FIG. 1), a memory 420 (e.g., a memory 130 in FIG. 1), and a processor 430 (e.g., a processor 120 in FIG. 1).

According to various embodiments, the communication module 410 may be a wireless communication module, and may include a module for Bluetooth™ legacy communication and/or BLE communication. The communication module 410 may operate independently of the processor 430, and may include one or more communication processors supporting a wireless communication. In various embodiments, the communication module 410 may be referred to as a communication interface or a communication circuit.

According to various embodiments, the communication module 410 may directly or indirectly communicate with at least one external electronic device (e.g., a first electronic device 301 and/or a second electronic device 302 in FIG. 3). The communication module 310 may transmit a data packet to the at least one external electronic device, and receive a response packet (e.g., an ACK packet or a NACK packet) to the transmitted data packet from the at least one external electronic device. According to an embodiment, the communication module 410 may transmit a first encoded data packet encoded by a first coding scheme in a predetermined first time interval, and may transmit a second encoded data encoded by a second coding scheme in a second time interval. According to another embodiment, the communication module 410 may transmit a first data packet having a first resolution and a second data packet having a second resolution within one time interval. According to still another embodiment, the communication module 410 may transmit a data packet of a first type and a data packet of a second type different from the first type within one time interval.

The antenna module 411 may include a plurality of antennas, and at least one antenna suitable for a communication scheme used in a communication network (e.g., a first network 198 in FIG. 1) may be selected from among the plurality of antennas by the communication module 410. According to various embodiments, a data packet or a response packet may be transmitted or received between the communication module 410 and at least one external electronic device via the selected at least one antenna.

According to various embodiments, the memory 420 may store various information used by at least one component (e.g., the communication module 410 and/or the processor 430) in the electronic device 401. Information stored in the memory 420 may include, for example, input data or output data for software and a command related thereto. According to various embodiments, the information stored in the memory 420 may include data (e.g., audio data) to be included in a data packet to be transmitted. The memory 420 may include a volatile memory or a non-volatile memory.

According to various embodiments, the processor 430 may, for example, run software to control at least one other component (e.g., a hardware or software component) in the electronic device 401 connected to the processor 430, and perform various data processing or computation. According to an embodiment, as at least a part of data processing or computation, the processor 430 may load a command or data received from another component (e.g., the communication module 410) into the volatile memory 420, process a command or data stored in the volatile memory 420, and store resulting data in non-volatile memory.

According to various embodiments, the processor 430 may perform all or some of operations of an electronic device 201 described in FIG. 2 and/or operations of an electronic device to be described below.

According to various embodiments, the electronic device 401 may further include various modules according to a provision form thereof. There are many variations according to a convergence trend of a digital device, so it is not possible to enumerate all of the variations, but components equivalent to the above-mentioned components may be further included in the electronic device 401. Further, in the electronic device 401 according to an embodiment, certain components may be excluded from the above-mentioned components or replaced with other components according to a provision form thereof. This will be easily understood by those of ordinary skill in the art.

According to various embodiments, an electronic device (e.g., an electronic device 101) includes a communication circuit (e.g., a communication module 410 such as a smartphone) configured to support a Bluetooth™ communication, and at least one processor (e.g., a processor 430) functionally connected to the communication circuit The at least one processor is configured to establish, via the communication circuit, a Bluetooth™ low energy (BLE) communication link with an external electronic device (e.g., an external electronic device 304 such as wireless earbuds), generate a first data packet from first audio data using a first coding scheme, generate a second data packet from the first audio data using a second coding scheme, and generate a third data packet from second audio data using the first coding scheme and through the BLE communication link, transmit the first data packet to the external electronic device in a first time interval of a predetermined time interval, and transmit the second data packet or the third data packet to the external electronic device in a second time interval of the predetermined time interval.

According to various embodiments, the at least one processor may be configured to transmit first feature information to the external electronic device through the BLE communication link, where the first feature information indicates whether the electronic device supports audio over BLE (AoBLE) and/or whether the electronic device supports a coding scheme change function, receive second feature information from the external electronic device through the BLE communication link, where the second feature information indicates whether the external electronic device supports the AoBLE and/or whether the external electronic device supports the coding scheme change function. Based on identifying that the external electronic device supports the AoBLE and supports the coding scheme change function using the second feature information, the at least one processor may transmit the first data packet and the second data packet to the external electronic device. Here, the audio over BLE (AoBLE) (in other words, Bluetooth Low Energy (LE) Audio) is a standard for low-power audio transmission over Bluetooth.

According to various embodiments, based on receiving, from the external electronic device, a negative acknowledgment (NACK) packet as a response signal to the first data packet during the first time interval or based on not receiving an acknowledgment (ACK) packet during the first time interval, after transmitting the first data packet to the external electronic device in the first time interval, the at least one processor may transmit the second data packet to the external electronic device in the second time interval.

According to various embodiments, based on receiving, from the external electronic device, an acknowledgement (ACK) packet as a response signal to the first data packet during the first time interval after transmitting the first data packet to the external electronic device, the at least one processor may transmit the third data packet to the external electronic device in the second time interval.

According to various embodiments, based on receiving, from the external electronic device, an ACK packet as a response signal to the second data packet during the second time interval after transmitting the second data packet to the external electronic device, the at least one processor may transmit the third data packet to the external electronic device in the second time interval.

According to various embodiments, the first data packet may have a higher resolution than the second data packet.

According to various embodiments, an electronic device (e.g., an external electronic device 304 such as wireless earbuds) includes a communication circuit (e.g., a communication module 310) configured to support a Bluetooth™ communication, and at least one processor (e.g., a processor 390) functionally connected to the communication circuit The at least one processor is configured to establish, via the communication circuit, a Bluetooth™ low energy (BLE) communication link with an external electronic device (e.g., an electronic device 101 such as a smartphone), and through the BLE communication link, receive a first data packet from the external electronic device in a first time interval of a predetermined time interval, and receive a second data packet from the external electronic device in a second time interval after the first time interval of the predetermined time interval. The first data packet is generated from first audio data using a first coding scheme, and the second data packet is generated from the first audio data using a second coding scheme.

According to various embodiments, the at least one processor may be further configured to receive first feature information from the external electronic device through the BLE communication link, where the first feature information indicates whether the external electronic device supports audio over BLE (AoBLE) and/or whether the external electronic device supports a coding scheme change function, and transmit second feature information to the external electronic device through the BLE communication link, where the second feature information indicates whether the electronic device supports the AoBLE and/or whether the electronic device supports the coding scheme change function, and based on identifying that the electronic device supports the AoBLE and supports the coding scheme change function, the at least one processor may receive the first data packet and the second data packet from the external electronic device.

According to various embodiments, based on transmitting, to the external electronic device, a negative acknowledgment (NACK) packet as a response signal to the first data packet during the first time interval after receiving the first data packet from the external electronic device, the at least one processor may receive the second data packet from the external electronic device in the second time interval.

According to various embodiments, the first data packet may have a higher resolution than the second data packet.

Hereinafter, an operation of an electronic device and an external electronic device according to various embodiments will be described with reference to FIGS. 5 to 21.

An external electronic device to be described below may be an electronic device 102 or an electronic device 104 in FIG. 1, and may be a first earbud 202 in FIG. 2 or a first earbud 302 in FIG. 3.

An electronic device to be described below may be an electronic device 101 in FIG. 1, an electronic device 201 in FIG. 2, an electronic device 301 in FIG. 3, or an electronic device 401 in FIG. 4.

Figure 5A:
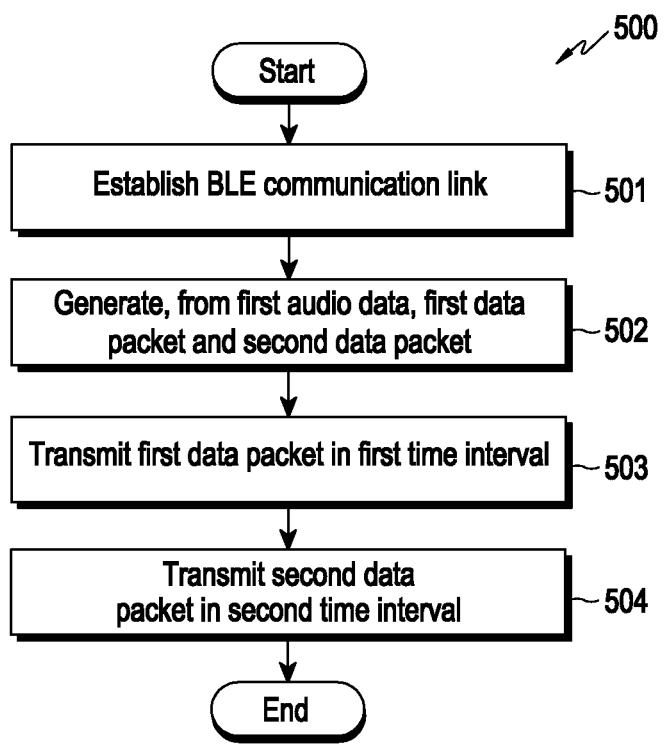
FIGS. 5A, 5B, 5C, and 5D are flowcharts illustrating an operation in which an electronic device transmits a data packet according to various embodiments.

FIG. 5A is a flowchart 500 schematically illustrating an operation in which an electronic device transmits a data packet according to various embodiments.

Referring to FIG. 5A, an electronic device may establish a BLE communication link with an external electronic device in operation 501. According to an embodiment, the electronic device which generates a BLE link with the external electronic device may exchange a plurality of pieces of information for a BLE communication with the external electronic device.

In operation 502, from first audio data, the electronic device may generate a first data packet using a first coding scheme and may generate a second data packet using a second coding scheme. According to an embodiment, the electronic device may generate the first data packet and the second data packet to match a function of an external electronic device which is identified based on information exchanged with the external electronic device. According to an embodiment, the electronic device may always generate the first data packet and the second data packet if a system performance is excellent and a resource is sufficient. According to another embodiment, the electronic device may generate the first data packet and the second data packet according to determining that the first data packet and the second data packet are required in a specific situation satisfying a predetermined condition.

In operation 503, the electronic device may transmit the first data packet to the external electronic device in a first time interval of a predetermined time interval.

In operation 504, the electronic device may transmit the second data packet to the external electronic device in a second time interval different from the first time interval of the predetermined time interval. According to an embodiment, if the electronic device does not receive an ACK packet as a response packet to the first data packet within the first time interval, the electronic device may transmit the second data packet in the second time interval.

According to an embodiment, the first time interval may be set as a part of a life cycle of one data packet, and the second time interval may be set as time after the first time interval of the life cycle. According to an embodiment, the first time interval and the second time interval may be dynamically set based on a communication environment between the external electronic device and the electronic device.

Figure 5B:
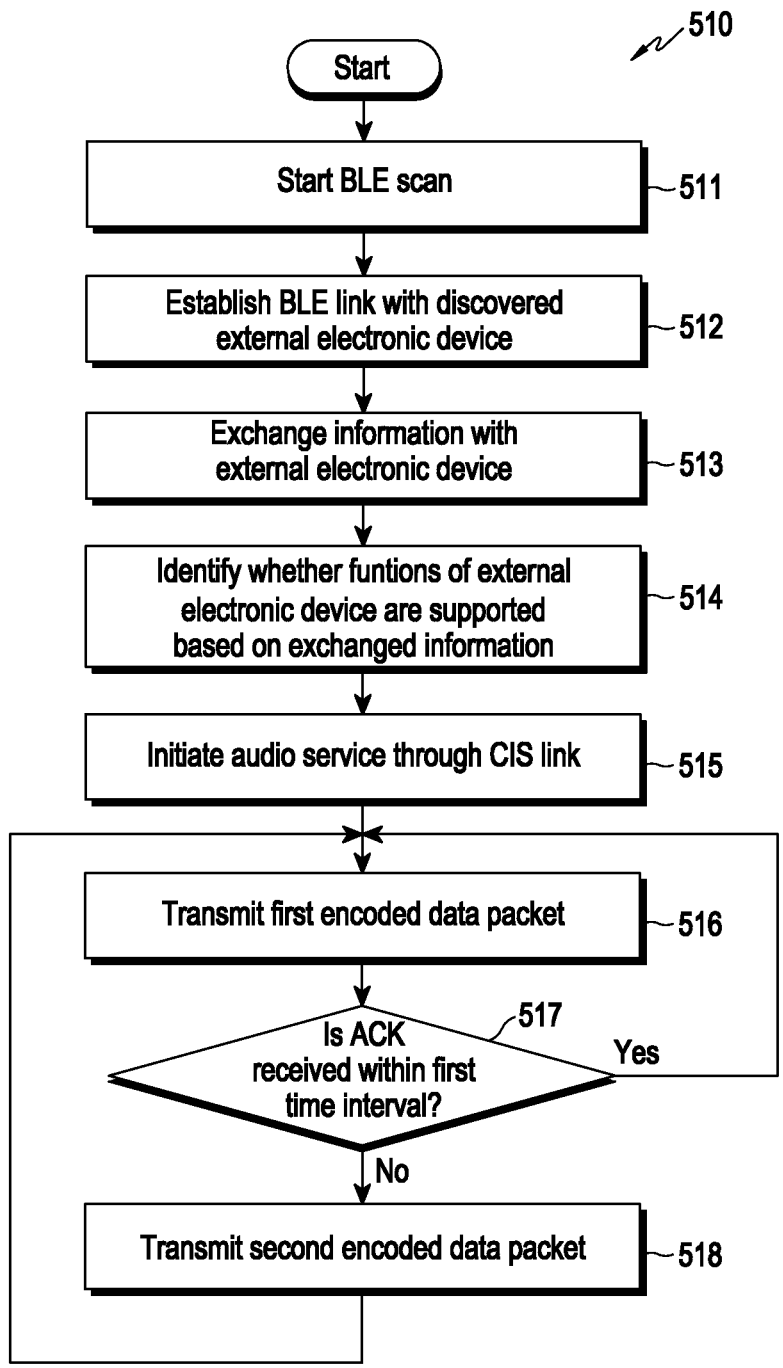

FIG. 5B is a flowchart 510 illustrating in more detail an operation of transmitting a data packet in an electronic device according to various embodiments.

Referring to FIG. 5B, in operation 511, an electronic device may start a BLE scan operation for discovering an external electronic device using a BLE communication technology. In operation 512, the electronic device may generate a BLE link with a discovered external electronic device.

The electronic device which generates the BLE link with the external electronic device may exchange pieces of information for a BLE communication with the external electronic device through a control packet of a link layer in operation 513. The electronic device may identify functions of the external electronic device based on exchanged information in operation 514.

According to an embodiment, the exchanged information may include version information and feature information. The version information may include a Bluetooth™ core specification version, a chipset manufacturing vendor identifier (vendor ID), and a sub version. The feature information may include AoBLE support information. According to an embodiment, the electronic device and the external electronic device may also check whether a coding scheme change function is supported with each other. For example, the coding scheme change function may mean a function that is changed to a second encoding scheme while using a first encoding scheme. For example, the electronic device may know that the external electronic device supports a coding scheme change function by combining pieces of information included in the version information exchanged with the external electronic device. For another example, the electronic device may know that the external electronic device supports the coding scheme change function using a specific link layer control packet, not a standard link layer control packet. For still another example, the electronic device may know that the external electronic device supports the coding scheme change function by exchanging separate data mutually promised for checking whether the coding scheme change function is supported with the external electronic device. For still another example, the electronic device may identify whether a corresponding function is supported without exchanging separate information with the external electronic device by checking a device name or a model name (model pet name).

The electronic device, which has identified whether the external electronic device supports the function, may initiate an audio service through the BLE link in operation 515. According to an embodiment, as the BLE link is generated between the external electronic device and the electronic device, an asynchronous connection less (ACL) link is generated, and the electronic device may initiate the audio service through the ACL link. According to an embodiment, the electronic device may perform the audio service based on AoBLE in consideration of providing a plurality of TWS devices with the audio service, and in this case, the electronic device may additionally generate a CIS link and perform the audio service through the generated CIS link.

When the audio service is initiated, the electronic device may transmit the first encoded data packet to the external electronic device in operation 516. For example, the electronic device may encode each audio data with two or more coding methods to generate two or more encoded data packets, and then transmit one of the encoded data packets to the external electronic device.

The electronic device may generate two or more encoded data packets from each audio data always or if a preset condition is satisfied. According to an embodiment, the electronic device may always generate two or more encoded data packets if a system performance is excellent and a resource is sufficient. According to another embodiment, the electronic device may generate two or more encoded data packets according to determining that the two or more encoded data packets are required in a specific situation satisfying a predetermined condition. For example, the condition may be determined based on a life cycle of a packet, a Received Signal Strength Indicator (RSSI), the number of NACK receptions, an ACK/NACK/ACK loss ratio, a retransmission rate, a packet error rate (PER), and/or a bit error rate (BER).

The two or more encoded data packets may be generated using different coding parameters or using different coding algorithms. For example, if the electronic device generates the first encoded data packet and the second encoded data packet from each audio data, the electronic device may transmit the first encoded data packet to the external electronic device in operation 516. The second encoded data packet may be generated to include minimum audio data capable of recovering the first encoded data packet if the external electronic device does not receive the first encoded data packet. For example, if the electronic device uses a scalable coding scheme, the first encoded data packet may be composed of (core+layer 1) and the second encoded data packet may be composed of core. According to an embodiment, the first encoded data packet may include high-capacity data of a high sound quality, and the second encoded data packet may include low-capacity data of a low sound quality.

In operation 517, the electronic device may identify whether an ACK packet is received as a response packet to the first encoded data packet within the predetermined first time interval. If the electronic device receives the ACK packet as the response packet to the first encoded data packet within the predetermined first time interval, the electronic device may perform operation 516 of transmitting a first encoded data packet of audio data having the next sequence number (SN) value after the transmitted audio data according to a general data transmitting method. If the ACK packet is not received or the NACK packet is received, the electronic device may flush the first encoded data packet and transmit the second encoded data packet within the second time interval in operation 518. According to an embodiment, a first time interval may be set as a part of a life cycle of one data packet, and a second time interval may be set as time after the first time interval of the life cycle. According to an embodiment, the first time interval and the second time interval may be dynamically set based on a communication environment between the external electronic device and the electronic device.

According to an embodiment, the electronic device may identify whether an ACK packet is received as a response packet to the second encoded data packet within the second time interval. According to an embodiment, if the electronic device receives the ACK packet as the response packet to the second encoded data packet within the second time interval, the electronic device may perform operation 516 of transmitting the first encoded data packet of the audio data having the next SN value of the transmitted audio data according to the general data transmitting method. According to an embodiment, if the electronic device does not receive the ACK packet, the electronic device may perform operation 516 of flushing the second encoded data packet and transmitting the encoded data packet having the next SN value. According to an embodiment, if the electronic device transmits the audio data having the next SN value, the first time interval and the second time interval for the packet having the next SN value may be reset.

Figure 5C:
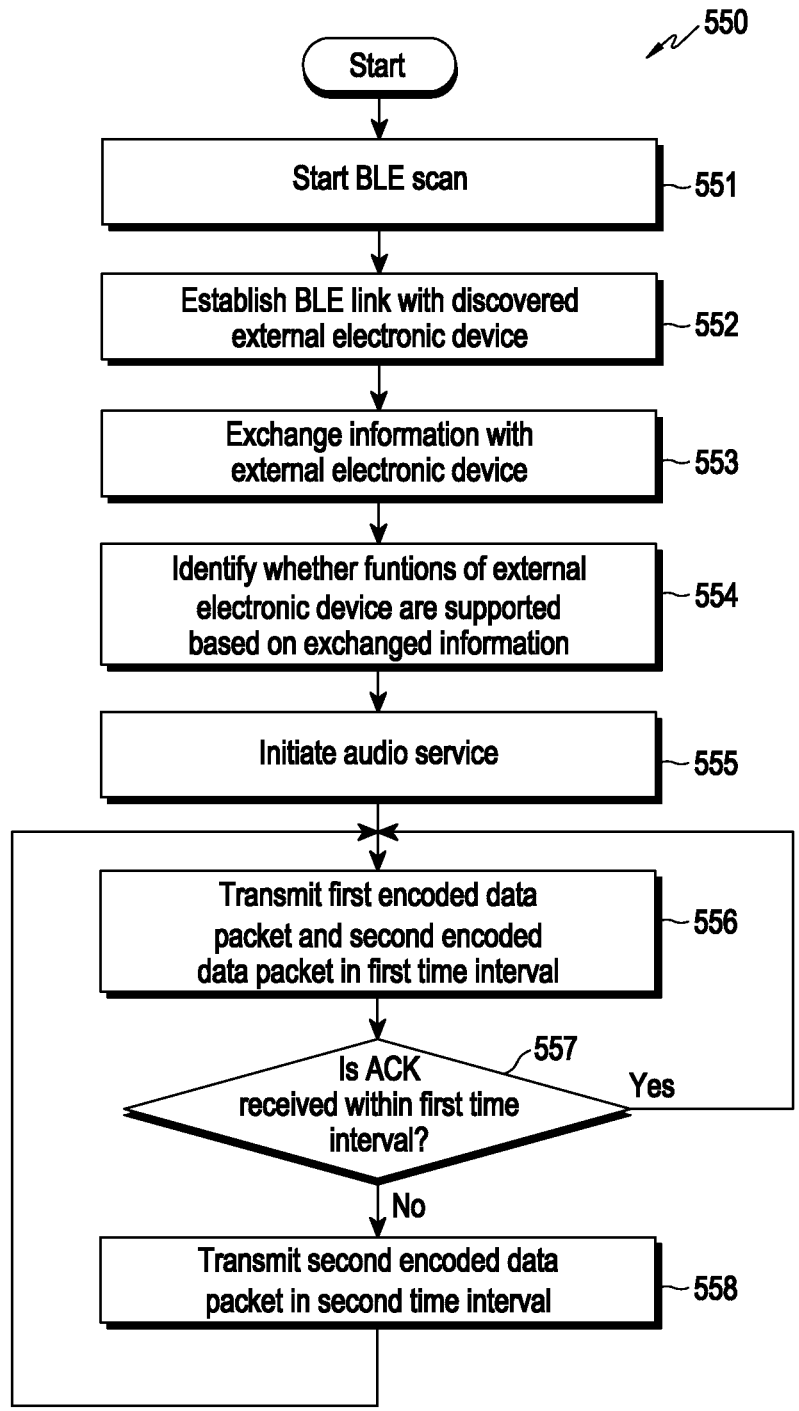

FIG. 5C is a flowchart 550 illustrating an operation in which an electronic device transmits a data packet according to various embodiments.

Referring to FIG. 5C, an electronic device may start a BLE scan operation for discovering an external electronic device using a BLE communication technology in operation 551. In operation 552, the electronic device may generate a BLE link with a discovered external electronic device.

The electronic device, which has generated the BLE link with the external electronic device, may exchange pieces of information for a BLE communication with the external electronic device through a control packet of a link layer in operation 553. The electronic device may identify functions of the external electronic device based on exchanged information in operation 554.

According to an embodiment, the exchanged information may include version information and feature information. The version information may include a Bluetooth™ core specification version, a chipset manufacturing vendor identifier (vendor ID), a sub version, and/or the like. The feature information may include AoBLE support information, and/or the like. According to an embodiment, the electronic device and the external electronic device may also check whether a coding scheme change function is supported with each other. For example, the electronic device may know that the external electronic device supports a coding scheme change function by combining pieces of information included in the version information exchanged with the external electronic device. For another example, the electronic device may know that the external electronic device supports the coding scheme change function using a specific link layer control packet, not a standard link layer control packet. For still another example, the electronic device may know that the external electronic device supports the coding scheme change function by exchanging separate data mutually promised for checking whether the coding scheme change function is supported with the external electronic device. For still another example, the electronic device may identify whether a corresponding function is supported without exchanging separate information with the external electronic device by checking a device name or a model name (model pet name).

The electronic device, which has identified whether the external electronic device supports the function, may initiate an audio service through a CIS link in operation 555.

If the audio service is initiated through the CIS link, the electronic device may encode each audio data with two or more coding methods to generate two or more encoded data packets, and then transmit the two or more encoded data packets to the external electronic device in operation 556.

The electronic device may generate two or more encoded data packets from each audio data always or if a preset condition is satisfied. According to an embodiment, the electronic device may always generate two or more encoded data packets if a system performance is excellent and a resource is sufficient. According to another embodiment, the electronic device may generate two or more encoded data packets according to determining that the two or more encoded data packets are required in a specific situation satisfying a predetermined condition. For example, the condition may be determined based on a life cycle of a packet, a Received Signal Strength Indicator (RSSI), the number of NACK receptions, an ACK/NACK/ACK loss ratio, a retransmission rate, a packet error rate (PER), and/or a bit error rate (BER).

The two or more encoded data packets may be generated using different coding parameters or using different coding algorithms. For example, if the electronic device generates the first encoded data packet and the second encoded data packet from each audio data, the electronic device may package the first encoded data packet and the second encoded data packet to transmit the packaged first encoded data packet and second encoded data packet to the external electronic device in operation 566. The second encoded data packet may be generated to include minimum audio data capable of recovering the first encoded data packet if the external electronic device does not receive the first encoded data packet. For example, if the electronic device uses a scalable coding scheme, the first encoded data packet may be composed of (core+layer 1) and the second encoded data packet may be composed of core. In an embodiment, the first encoded data packet may include high-capacity data of a high sound quality, and the second encoded data packet may include low-capacity data of a low sound quality.

In operation 557, the electronic device may identify whether an ACK packet is received as a response packet to the first encoded data packet and the second encoded packet within a predetermined first time interval. If the electronic device does not receive the ACK packet, in operation 558, the electronic device may flush the first encoded data packet and transmit the second encoded data packet within a second time interval.

Figure 5D:
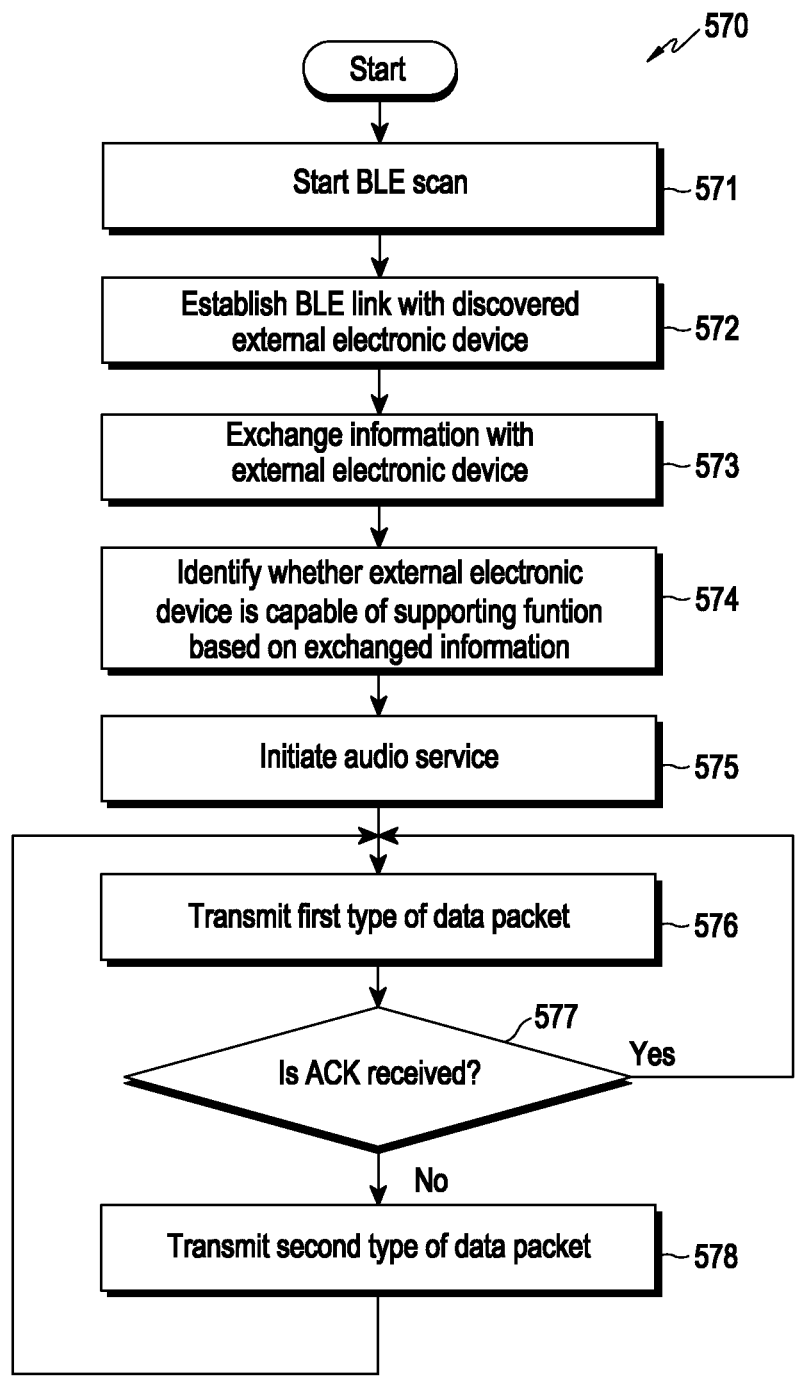

FIG. 5D is a flowchart 570 illustrating an operation in which an electronic device transmits a data packet according to various embodiments.

Referring to FIG. 5D, an electronic device may start a BLE scan operation for discovering an external electronic device using a BLE communication technology in operation 571. In operation 572, the electronic device may generate a BLE link with a discovered external electronic device.

The electronic device, which has generated the BLE link with the external electronic device, may exchange pieces of information for a BLE communication with the external electronic device through a control packet of a link layer in operation 573. The electronic device may identify functions of the external electronic device based on exchanged information in operation 574.

According to an embodiment, the exchanged information may include version information and feature information. The version information may include a Bluetooth™ core specification version, a chipset manufacturing vendor identifier (vendor ID), a sub version, and/or the like. The feature information may include AoBLE support information, and/or the like.

The electronic device, which has identified whether the external electronic device supports the function, may initiate an audio service through a CIS link in operation 575.

If the audio service is initiated through the CIS link, the electronic device may encode each audio data to generate a first type of data packet and a second type of data packet and then transmit the first type of data packet and the second type of data packet to the external electronic device in operation 576.

The electronic device may encode each audio data to generate a first type of data packet and a second type of data packet always or if a preset condition is satisfied. According to an embodiment, the electronic device may generate a first type of data packet and a second type of data packet according to determining that the first type of data packet and the second type of data packet are required in a specific situation satisfying a predetermined condition. For example, the condition may be determined based on a life cycle of a packet, a Received Signal Strength Indicator (RSSI), the number of NACK receptions, an ACK/NACK/ACK loss ratio, a retransmission rate, a packet error rate (PER), and/or a bit error rate (BER).

The first type of data packet and the second type of data packet may be generated to have different encoding configurations. For example, if the electronic device generates the first type of data packet from each audio data, the electronic device may transmit the first type of data packet with SN=K to the external electronic device in operation 576.

In operation 577, the electronic device may identify whether an ACK packet is received as a response packet to the first type of data packet (SN=K). Upon receiving the ACK packet, the electronic device may transmit a first type of data packet (SN=K+1) in operation 576. If the electronic device does not receive the ACK packet, the electronic device may retransmit the first type of data packet (SN=K) a predetermined number of times, and if the electronic device does not receive the ACK packet despite the retransmission, the electronic device may transmit a second type of data packet (SN=K) in operation 578. The second type of data packet may be configured to include minimum data from which the external electronic device may recover the first type of data if the external electronic device does not receive the first type of data.

In an embodiment, a first type of data may be configured as shown in [Table 1] below, and a second type of data may be configured as shown in [Table 2] below. For example, the first type of data may be configured to include encoded data, and the second type of data may be configured in a form in which a payload/ISO interval and a message integrity code (MIC) are excluded from the first type of data

TABLE 1

| Preamble | Access Address (AA) | Payload Header | Payload/ISO interval | MIC | CRC |
| --- | --- | --- | --- | --- | --- |
| 8 μs | 16 μs | 8 μs | 480 μs | 16 μs | 12 μs |

TABLE 2

| Preamble | AA | Payload Header | CRC |
| --- | --- | --- | --- |
| 8 μs | 16 μs | 8 μs | 12 μs |

As shown in [Table 1] and [Table 2], because length of the second type of data is very short compared to length of the first type of data, transmission of the second type of data with relatively short length may be successful even in an interference situation in which transmission of the first type of data fails.

Figure 6:
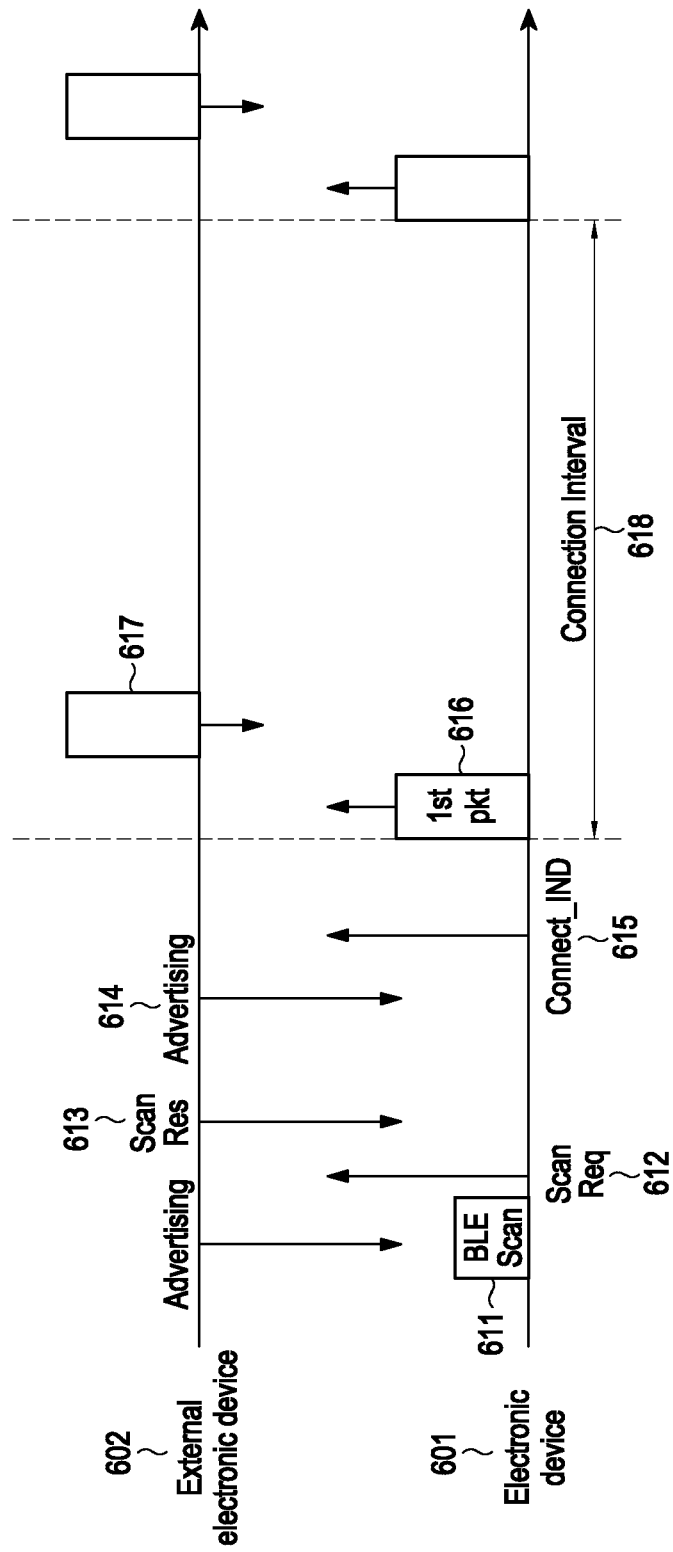
FIG. 6 is a diagram illustrating an operation in which an electronic device generates a BLE link with an external electronic device according to various embodiments.

FIG. 6 illustrates an operation in which an electronic device generates a BLE link with an external electronic device according to various embodiments. A procedure illustrated in an embodiment may correspond to operation 501 and operation 502 in FIG. 5A, and operation 511 and operation 512 in FIG. 5B.

Referring to FIG. 6, an electronic device 601 may initiate a BLE scan 611 and receive an advertising signal transmitted from an external electronic device 602. Upon receiving the advertising signal from the external electronic device 602, the electronic device 601 may recognize the external electronic device 602 by transmitting a scan request 612 to the external electronic device 602 and receiving a scan response 613 from the external electronic device 602. Thereafter, the electronic device 601 may receive an advertising signal 614 from the external electronic device 602 and transmit a connection indication (connect_IND) 615 to the external electronic device 602. According to an embodiment, the external electronic device 602 may generate an advertisement signal with a multicast scheme or a broadcast scheme. The advertising signal may be a signal for connecting to an unspecified neighbor electronic device (e.g., an audio source) using a wireless communication (e.g., a BLE communication) technology. According to an embodiment, the external electronic device 602 may be stored in a separate case which may communicate with the external electronic device 602 and the electronic device 601, and the external electronic device 602 or the separate case may generate an advertising signal if the separate case is opened in a state in which the external electronic device 602 is stored in the separate case. According to an embodiment, the advertising signal may include at least one of identification information of the external electronic device 602, user account information, pairing information about whether it is currently paired with another device, a pairing list regarding a previously paired device, simultaneous pairing information regarding devices which may be paired simultaneously, transmission power information, a sensed area, or battery state information about a remaining battery level. According to an embodiment, the external electronic device 602 may generate the advertising signal according to a designated condition. For example, if power is supplied to the external electronic device 602, the external electronic device 602 may output the advertising signal based on at least one of a designated time period and a user's input.

The electronic device 601 receiving the advertising signal 614 from the external electronic device 602 may output a user interface for connection with the external electronic device 602 on a display. According to an embodiment, the electronic device 601 may output the user interface according to various conditions based on pieces of information included in the advertising signal 614. For example, the electronic device 601 may display an image corresponding to the external electronic device 602 on the user interface.

The electronic device 601, which has generated the BLE link with the external electronic device 602, may transmit a data packet (e.g., 1$^{st}$ packet) 616 to the external electronic device 602 and receive a response packet 617 in response to the data packet 616 based on a determined parameter during a connection interval 618.

Figure 7:
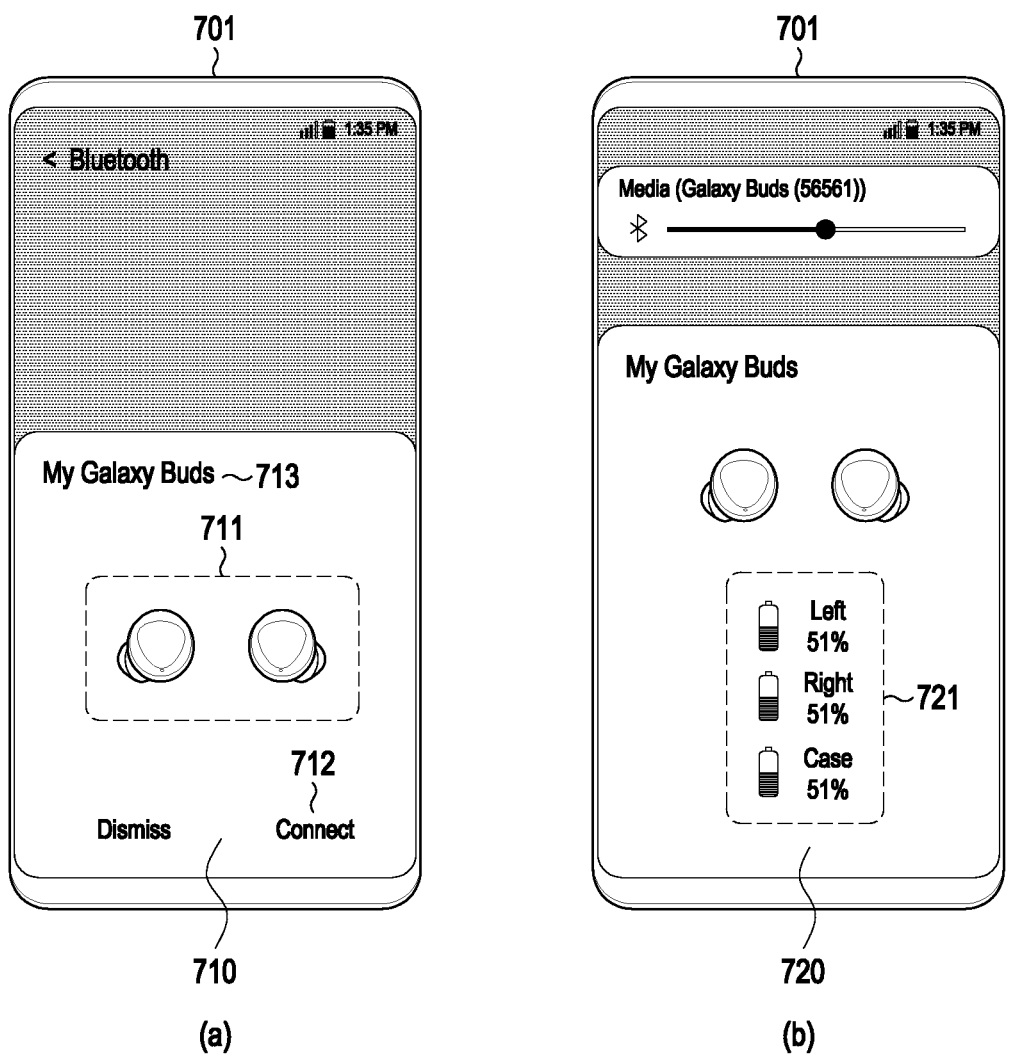
FIG. 7 is a diagram illustrating an example of a user interface displayed on a display in an electronic device in a case that a BLE link is established with an external electronic device according to various embodiments.

FIG. 7 illustrates an example of a user interface displayed on a display in an electronic device in a case that a BLE link is established with an external electronic device according to various embodiments.

Referring to (a) in FIG. 7, an electronic device 701 (e.g., an electronic device 101 in FIG. 1) may recognize an external electronic device by receiving an advertising packet transmitted from the external electronic device, and output a first user interface 710 for informing a user of the recognized external electronic device on a display (e.g., a display module 160 in FIG. 1) in the electronic device 701. According to an embodiment, the external electronic device may be composed as a pair including a first earbud and a second earbud, and the electronic device 701 may recognize, as one electronic device, the external electronic device which is composed as the pair.

According to an embodiment, the first user interface 710 may include at least one of an image 711 indicating a shape of the external electronic device and/or a text 713 indicating device recognition information (e.g., My Galaxy Buds) of the external electronic device. The device recognition information may display a result (e.g., dismiss or connect) 712 of recognizing the external electronic device in the electronic device. The device recognition information may indicate whether a second electronic device has been previously paired with a first electronic device or not, or may be displayed based on a user account.

Referring to (b) in FIG. 7, an electronic device 701 may output a second user interface 720 informing that a communication connection with an external electronic device has been established via a display (e.g., a display module 160 in FIG. 1). According to an embodiment, the second user interface 720 may further include an image 721 indicating battery states of the electronic device 701 and the external electronic device.

The electronic device, which has generated the BLE communication link with the external electronic device, may transmit a data packet to the external electronic device based on a determined parameter every connection interval and receive a response packet thereto. According to an embodiment, the data packet may be media data or voice data. According to an embodiment, if the electronic device and the external electronic device support an audio over BLE (AoBLE) function in order to provide a high-quality audio service, the data packet may be transmitted and received using a connectionless broadcast isochronous stream (BIS)/broadcast isochronous group (BIG) or a connection-oriented connected isochronous stream (CIS)/connected isochronous group (CIG) in the AoBLE function. The BIS/BIG and the CIS/CIG will be described later.

Figure 8:
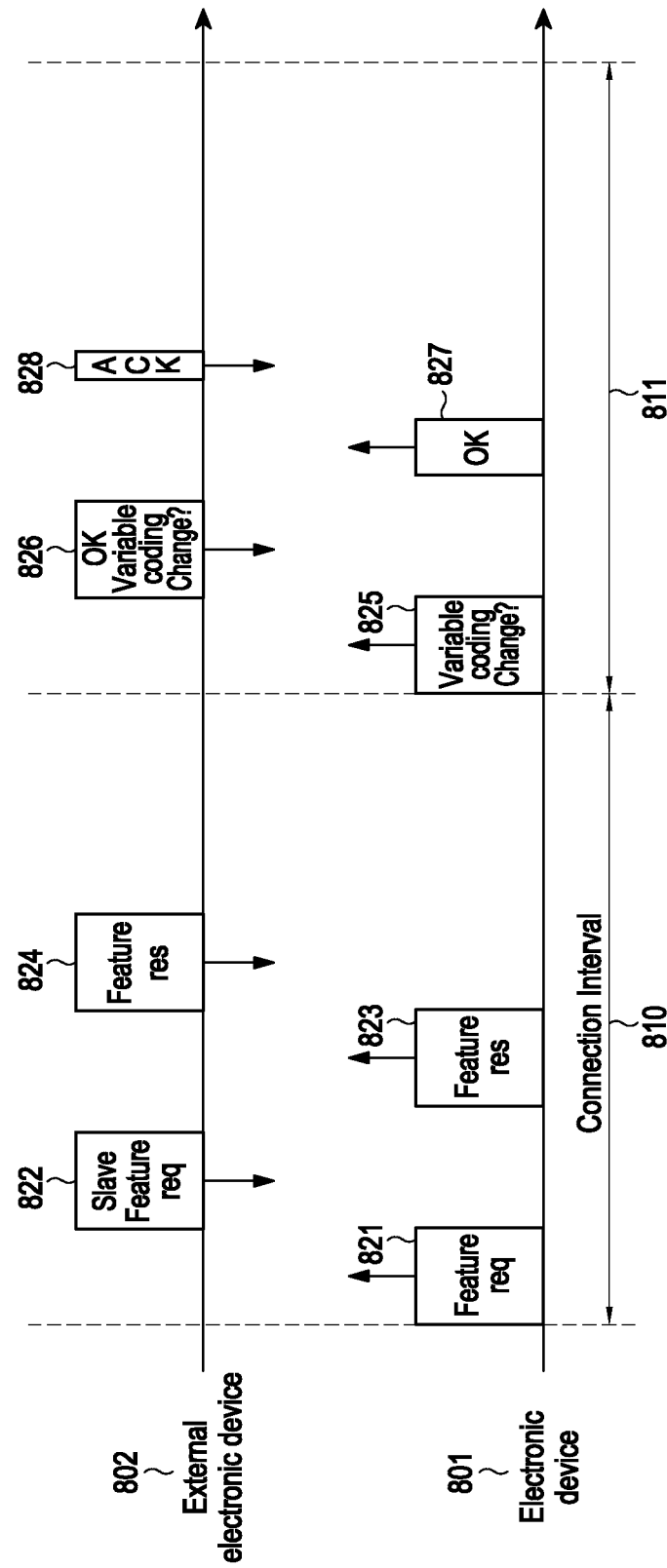
FIG. 8 is a diagram illustrating an example in which an electronic device exchanges feature information with an external electronic device and checking whether it is possible to support a coding scheme change function with the external electronic device according to various embodiments.

FIG. 8 illustrates an example in which an electronic device exchanges feature information with an external electronic device and checks whether it is possible to support a coding scheme change function with the external electronic device according to various embodiments. A procedure illustrated in an embodiment may correspond to operation 503 and operation 504 in FIG. 5A and operation 553 and operation 554 in FIG. 5C.

Referring to FIG. 8, an electronic device 801 may transmit a feature request (feature req) packet 821 to an external electronic device 802 and receive a slave feature request (slave feature req) packet 822 from the external electronic device 802 during a connection interval 810. The electronic device 801 may transmit, to the external electronic device 802, a feature response (feature res) packet 823 to the slave feature request packet 822, and receive, from the external electronic device 802, a feature response packet 824 to the feature request packet 821. Thereafter, in a connection interval 811, the electronic device 801 may transmit a packet ("variable coding change?") 825 for asking whether the external electronic device 802 supports a coding scheme change function, receive, from the external electronic device 802, a packet ("OK, variable coding change?") 826 for confirmation and asking whether a coding scheme change is possible, and transmit, to the external electronic device 802, a confirmation packet 827 thereto. The electronic device 801 may finally receive an ACK packet 828 from the external electronic device 802.

Figure 9:
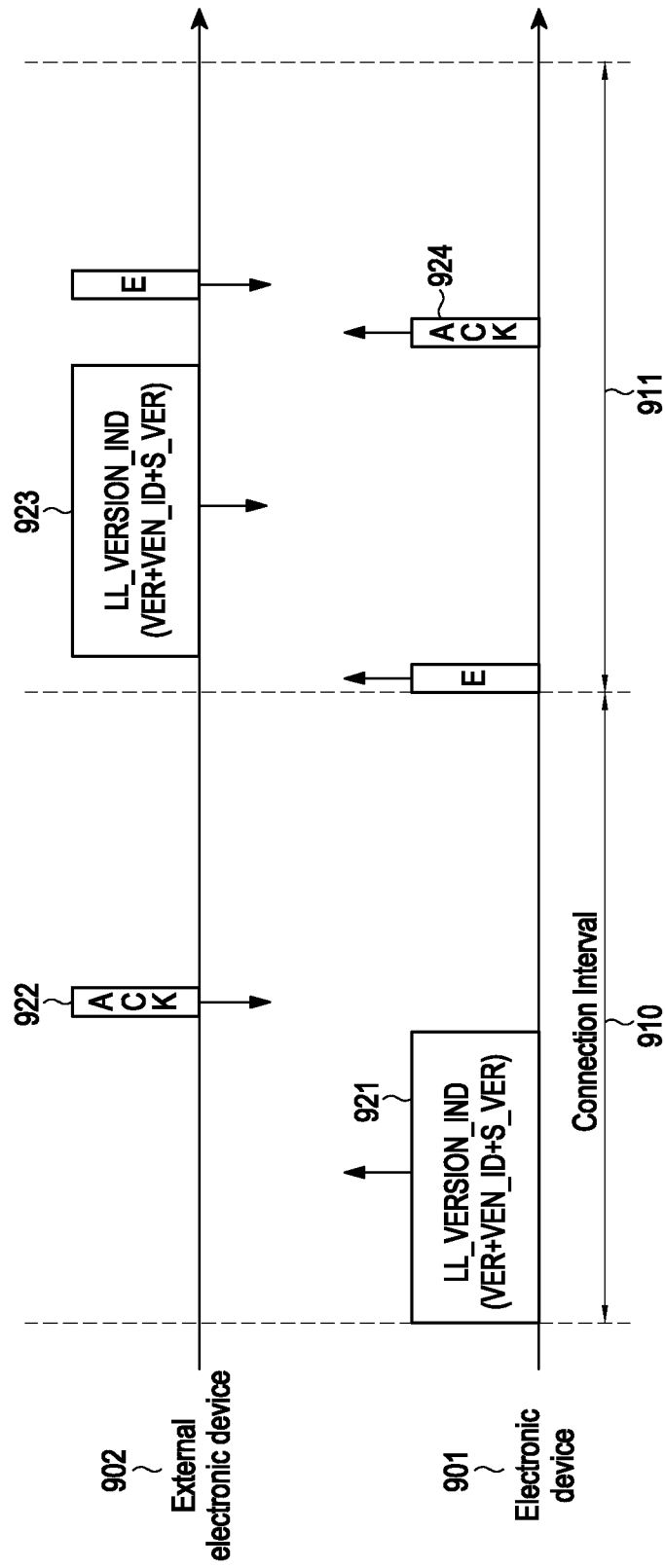
FIG. 9 is a diagram illustrating an example in which an electronic device identifies whether an external electronic device is capable of supporting a coding scheme change function according to various embodiments.

FIG. 9 illustrates an example in which an electronic device identifies whether an external electronic device is capable of supporting a coding scheme change function according to various embodiments. A procedure illustrated in an embodiment may correspond to operation 504 in FIG. 5A and operation 554 in FIG. 5C.

Referring to FIG. 9, an electronic device 901 may generate a BLE communication link with an external electronic device 902, and the electronic device 901 and the external electronic device 902 may identify each other's versions through link layer control packets 921 and 923 (e.g., an LL_VERSION_IND packet) transferred through the BLE communication link.

According to an embodiment, the electronic device 901 may transmit an LL_VERSION_IND packet 921 and receive an ACK packet 922 as a response packet corresponding thereto from the external electronic device 902 within a connection interval 911. According to an embodiment, the LL_VERSION_IND packet 921 may include at least one of a VER field indicating a Bluetooth™ version of the electronic device 901, a VEN_ID field indicating a vendor, and/or an S_VER field indicating a sub version. The external electronic device 902 may recognize that the electronic device 901 supports a coding scheme change function based on the fields.

According to an embodiment, the electronic device 901 may receive an LL_VERSION_IND packet 923 from the external electronic device 902 and transmit an ACK packet 924 as a response packet corresponding thereto to the external electronic device 902 in the next connection interval 911. According to an embodiment, the LL_VERSION_IND packet 923 may include at least one of a VER field, a VEN_ID field, and an S_VER field which are related to the external electronic device 902. The electronic device 901 may recognize that the external electronic device 902 supports the coding scheme change function based on the fields.

In an embodiment, the electronic device 901 and the external electronic device 902 may make a promise in advance to operate according to a predetermined coding scheme change policy upon receiving a packet of a designated combination of a Bluetooth™ version, a manufacturer, and a sub version. For example, the coding scheme change policy may be determined to use the highest resolution (e.g., an LE HR) currently supportable in a first time interval within an isochronous (ISO) interval, and use a lower resolution (e.g., an LE LR) than the first time interval in a second time interval within the ISO interval.

Figure 10:
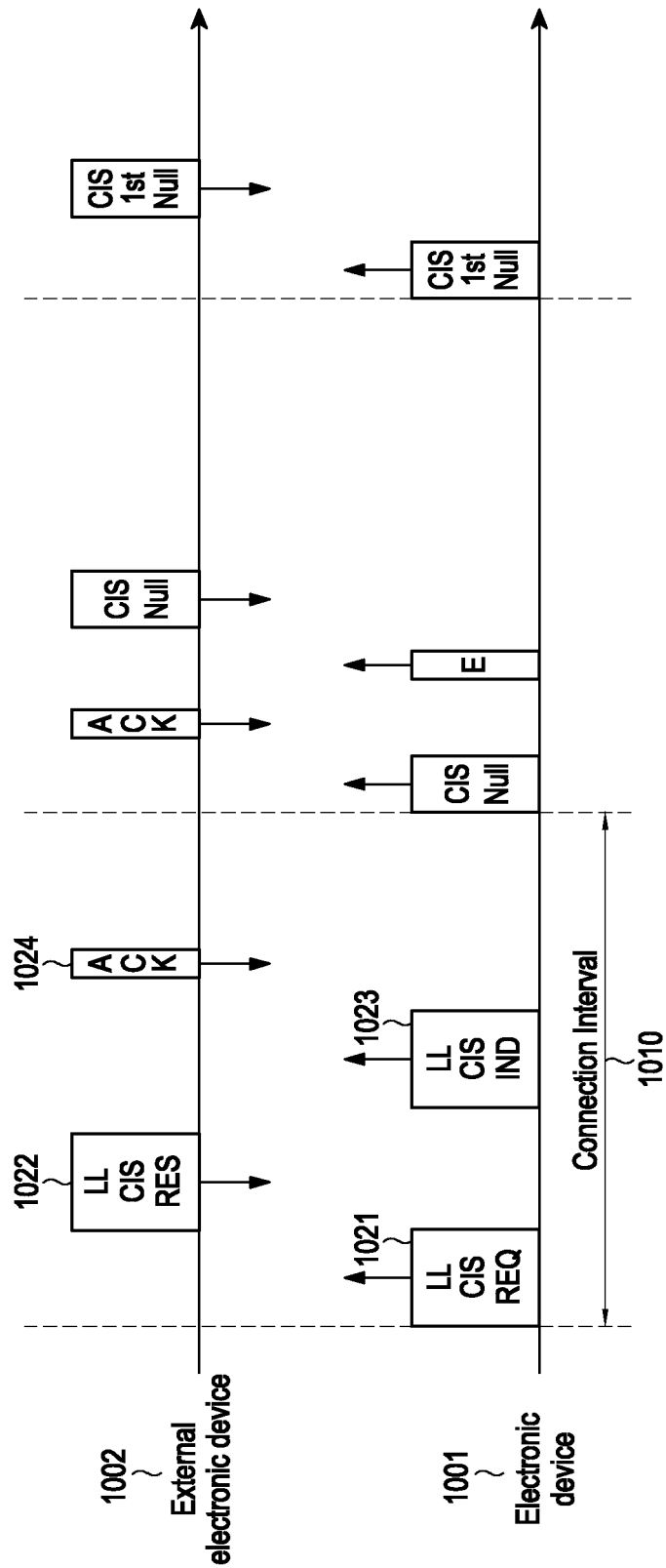
FIG. 10 is a diagram illustrating a procedure in which an electronic device starts an audio service through a CIS link according to various embodiments.

FIG. 10 illustrates a procedure in which an electronic device starts an audio service through a CIS link according to various embodiments. A procedure illustrated in an embodiment may correspond to operation 515 in FIG. 5B.

A Connected Isochronous Stream (CIS) means logical transmission capable of transmitting isochronous data in any direction between electronic devices which have generated a communication link. The CIS is capable of transmitting a data packet of a variable size as well as a fixed size, and transmitting a data packet of a variable size and one or more data packets in each isochronous event, so data rate adjustment is possible. Data traffic may be all of unidirectional or bidirectional between electronic devices, and has an acknowledgment protocol for improving packet transmission reliability.

The CIS may be defined with various parameters such as, for example, ISO_Interval, Sub_Interval, SE_Length, Max_PDU, Max_SDU, MPTm, MPTs, NES, BN, and FT. These parameters are not changed after a CIS link is generated until the CIS link is terminated. The ISO_Interval is time between anchor points of adjacent CIS events. A CIS event means an opportunity for a master device and a slave device to exchange a CIS protocol data unit (PDU), and the CIS event occurs at regular intervals and in turn includes an NSE subevent. Each CIS event occurs until a CIS link is terminated and starts at a CIS anchor point. The Sub_Interval is time between starts of two consecutive subevents. The SE_Length is a maximum length of a subevent. The Max_PDU means a maximum number of bytes which each CIS data PDU may transmit. The Max_SDU is a maximum size of a service data unit (SDU) on a CIS. The MPTm means time it takes for a master device to transmit a packet including a CIS PDU having a payload of a Max_PDU through a PHY used for a CIS, and the MPTs means time it takes for a slave device to transmit the packet including the CIS PDU having the payload of the Max_PDU through the PHY used for the CIS. The number of subevents (NSE) is a maximum number of subevents in each CIS event. The BN is a Burst Number, and in a unidirectional case, the BN may be set to zero, and be set up to a maximum of 15. The Flush Timeout (FT) may indicate a maximum value of CIS events in which a CIS data PDU may be transmitted and/or retransmitted, and may have a value from 1 to a maximum of 255.

A connected isochronous group (CIG) is a bundle of CISs which provide the same service, and consists of two or more CISs whose ISO Intervals are the same. CISs in the CIG have a common timing reference based on master timing, and may be synchronized in units of time. A CIG event starts at the earliest CIS anchor point and ends at a subevent end time point of the last CIS.

Referring to FIG. 10, an electronic device 1001 may transmit an LL_CIS_REQ packet 1021 for generating a CIS link to an external electronic device 1002 during a connection interval 1010 in a BLE communication link. Within the connection interval 1010, the electronic device 1001 may receive an LL_CIS_RES packet 1022 from the external electronic device 1002, and the electronic device 1001 may start a CIS link by transmitting an LL_CIS_IND packet 1023 and then receiving an ACK packet 1024 from the external electronic device 1002.

Figure 11A:
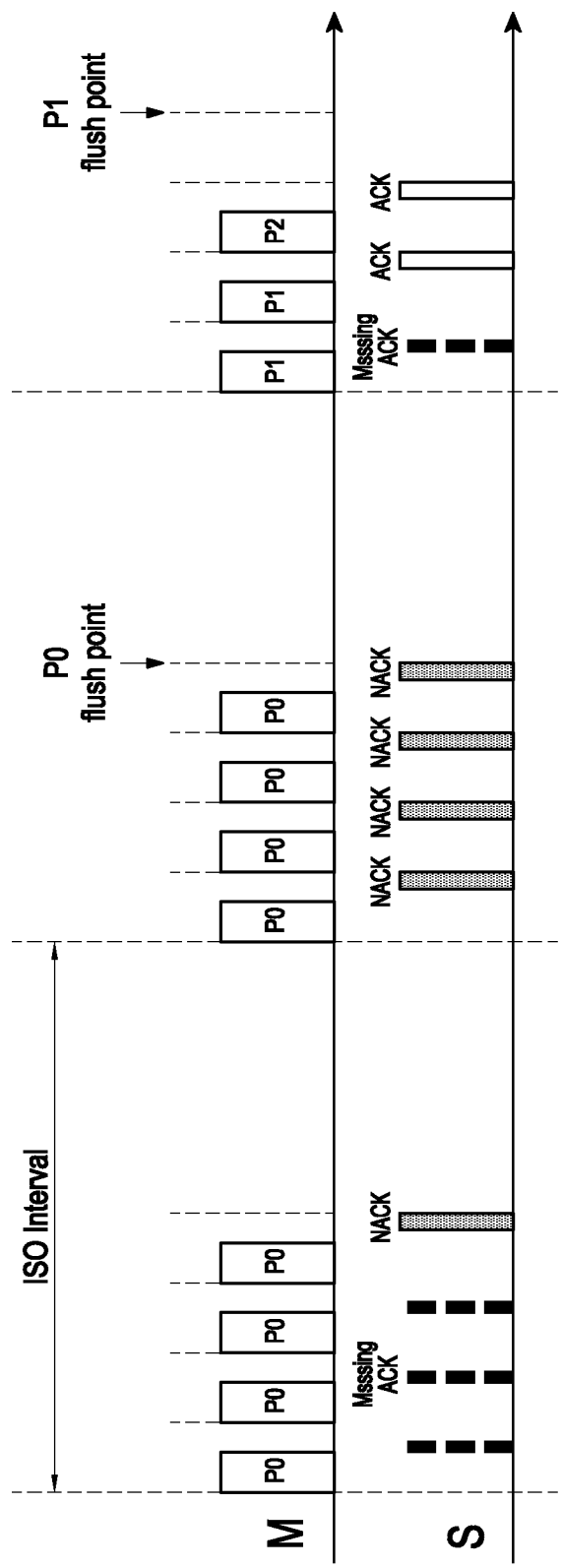
FIGS. 11A and 11B are diagrams for describing an example of an audio service through a CIS link according to an embodiment.
Figure 11B:
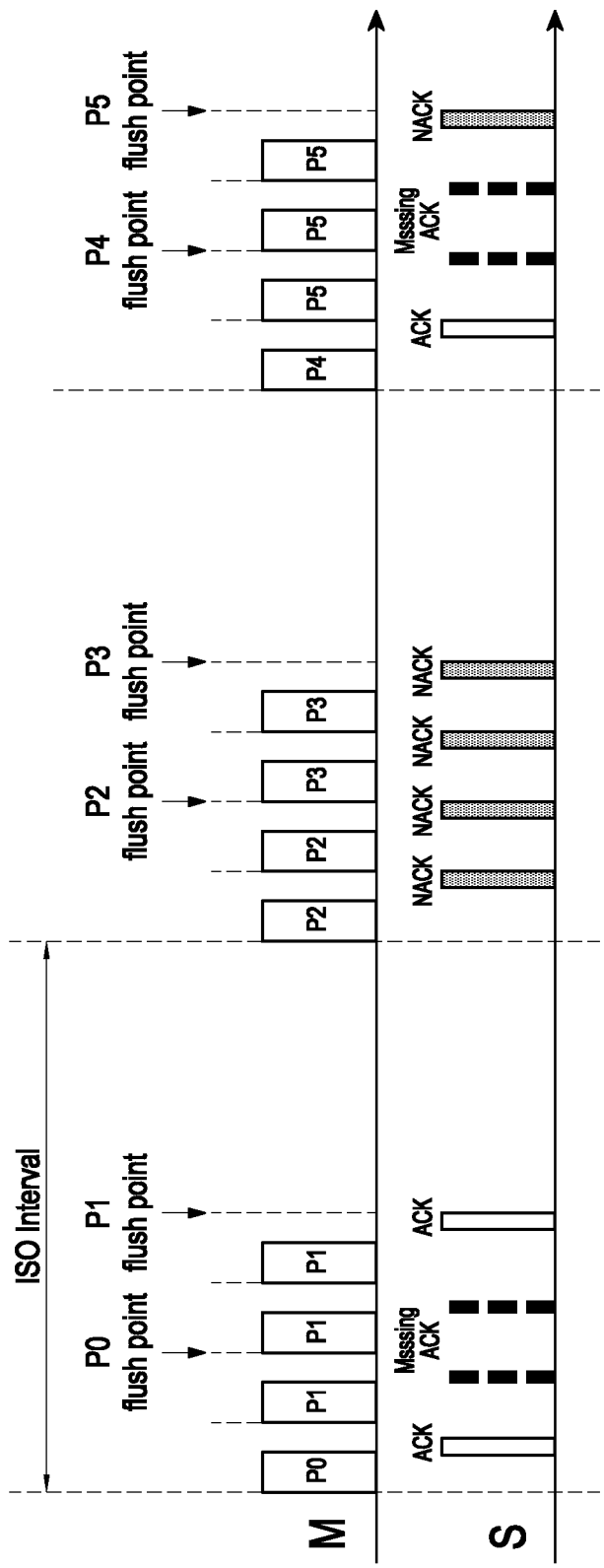

FIGS. 11A and 11B are diagrams for describing an example of an audio service through a CIS link according to an embodiment.

FIG. 11A illustrates data packet transmission/reception between a master device M (e.g., an electronic device) and a slave device S (e.g., an external electronic device) when BN=1, FT=2, and NSE=4, and FIG. 11B illustrates data packet transmission/reception between the master device M (e.g., the electronic device) and the slave device S (e.g., the external electronic device) when BN=2, FT=1, and NSE=4.

Referring to FIG. 11A, during each ISO interval, a master device may transmit a packet four times according to an NSE value. Although the master device has transmitted P0 four times during a first ISO interval, as a NACK packet is received from a slave device, the master device may retransmit P0 during a second ISO interval. In the second ISO interval, P0 has been retransmitted four times, but a NACK packet has been received from the slave device, and FT=2, so P0 is flushed in the second ISO interval. If P0 has been transmitted normally, P1 should have been transmitted in the second ISO interval, but P1 may not be transmitted to retransmit P0, so P1 may be transmitted in a third ISO interval thereafter. In the third ISO interval, the master device has received an ACK packet from the slave device after transmitting P1 two times, so the master device may use the remaining two transmission opportunities for transmitting P2 which should be originally transmitted in the third ISO interval. Further, P1 is flushed at a time point at which the fourth transmission within the third ISO interval has been completed according to an FT=2 value regardless of whether an ACK/NACK packet is received.

Referring to FIG. 11B, during each ISO interval, a master device may transmit a packet four times according to an NSE value. As the master device receives an ACK packet immediately after transmitting P0 once during a first ISO interval, the master device may transmit P1 at the remaining three transmission opportunities. Further, BN=2 and FT=1, so P0 is flushed at a time point at which a second transmission has been completed regardless of whether ACK/NACK is received, and P1 is also flushed at a time point at which a fourth transmission has been completed regardless of whether ACK/NACK is received. As all of P0 and P1 are successfully transmitted in the first ISO interval, the master device may transmit each of P2 and P3 twice in turn in a second ISO interval. Although the master device has received NACK packets for all of P2 and P3, according to FT=1, P2 is flushed at a time point at which a second transmission has been completed, and P3 is flushed at a time point at which a fourth transmission has been completed. All of P2 and P3 have flushed in the second ISO interval, so all of P2 and P3 may not be retransmitted in a third ISO interval, and each of P4 and P5 may be transmitted twice in turn in the third ISO interval. An ACK packet for P4 is received after first transmission, so the master device may transmit P5 instead of transmitting P4 in second transmission, and P5 may be transmitted a total of three times. Regardless of ACK/NACK reception, P4 is flushed at a time point at which the second transmission has been completed, and P5 is flushed at a time point at which fourth transmission has been completed.

FIGS. 12A to 12F illustrate an operation of always generating two encoded data packets in an electronic device according to various embodiments.

Figure 12A:
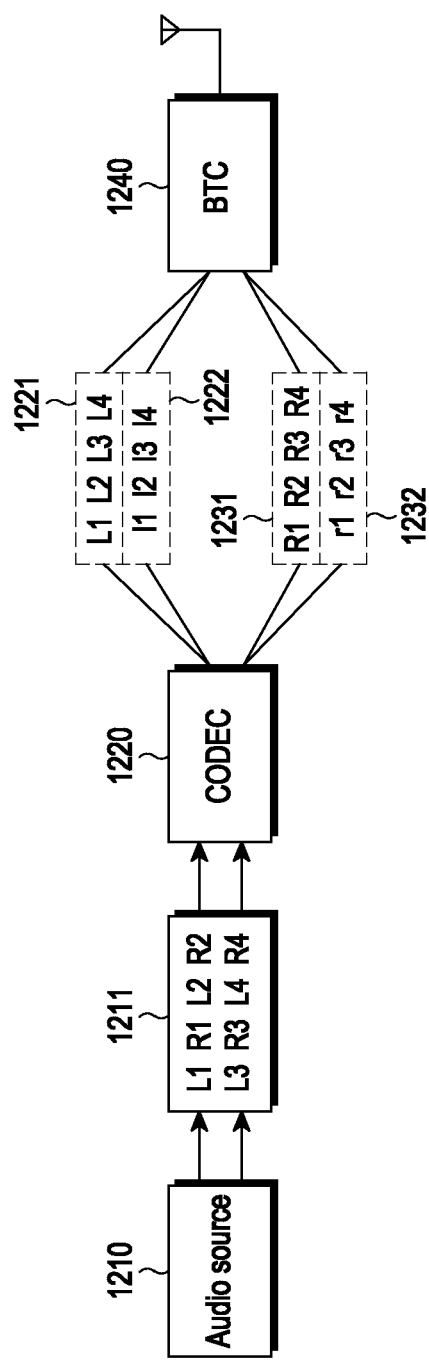
FIGS. 12A to 12F illustrate an operation of always generating two encoded data packets in an electronic device according to various embodiments.

Referring to FIG. 12A, an audio source 1210 consists of audio data 1211 in which left audio data and right audio data are mixed, the audio data 1211 is encoded into left audio data 1221 and 1222 and right audio data 1231 and 1232 through a CODEC 1220, and the left audio data 1221 and 1222 and the right audio data 1231 and 1232 are compressed in a block truncation coding (BTC) 1240 and then transmitted to an external electronic device. According to an embodiment, the CODEC 1220 may be included within the BTC 1240.

According to an embodiment, the CODEC 1220 may generate two encoded audio data 1221 and 1222 and 1231 and 1232 for the left audio data and the right audio data 1211 from one audio source 1210, respectively.

Figure 12B:
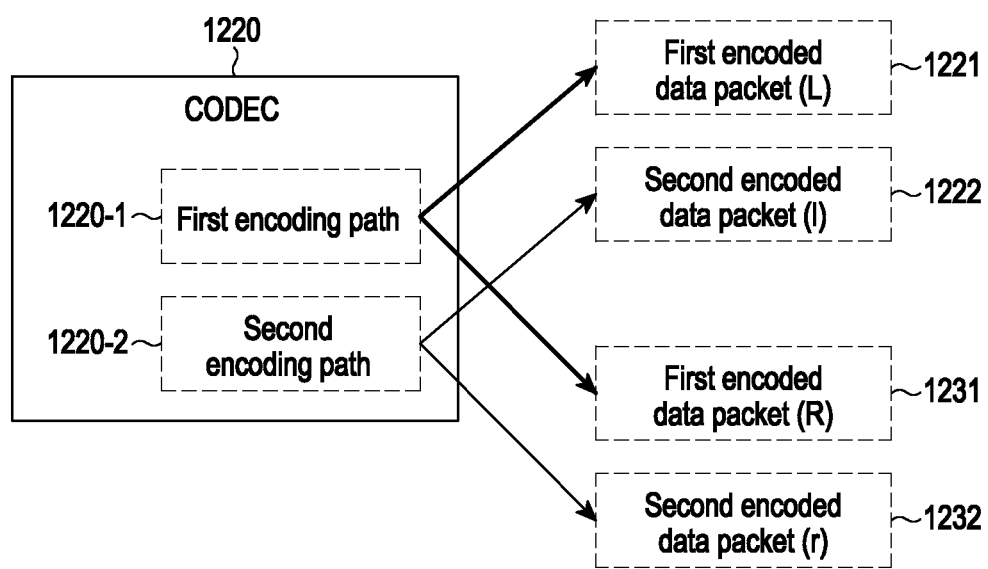

Referring to FIG. 12B, according to an embodiment, if two audio encoded packets are generated from one piece of audio data, the CODEC 1220 may include a first encoding path 1220-1 and a second encoding path 1220-2. The one piece of audio data may be encoded through the first encoding path 1220-1 and the second encoding path 1220-2. As the audio data passes through the first encoding path 1220-1, first left encoded data (L) 1221 and first right encoded data (R) 1231 may be generated, and as the audio data passes through the second encoding path 1220-2, second left encoded data (l) 1222 and second right encoded data (r) 1232 may be generated.

Figure 12C:
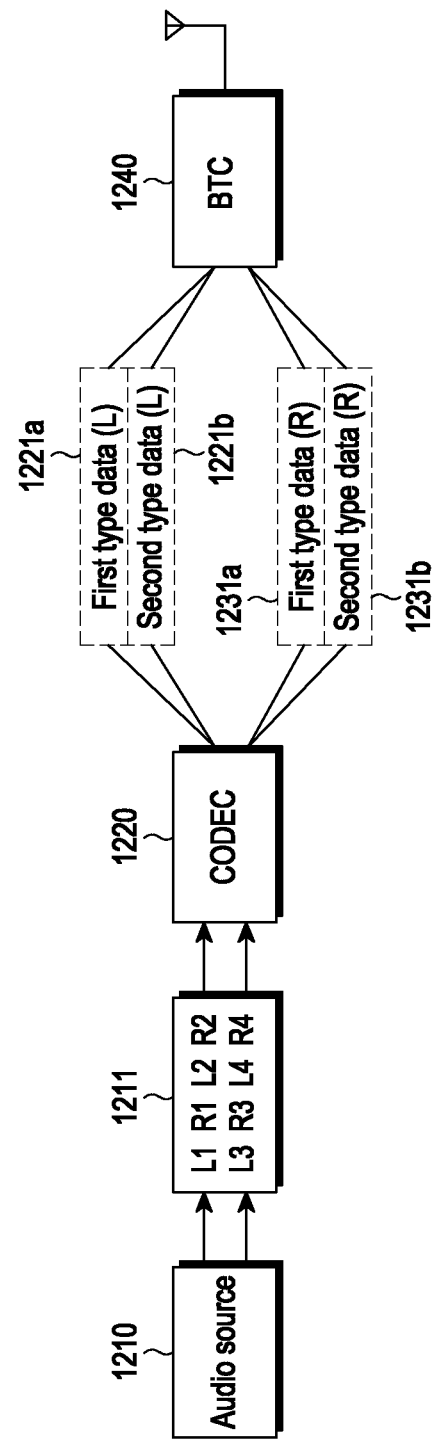

Referring to FIG. 12C, an audio source 1210 consists of audio data 1211 in which left audio data and right audio data are mixed, the audio data 1211 is encoded into left audio data 1221 and 1222 and right audio data 1231 and 1232 through a CODEC 1220, and the left audio data 1221*a* and 1221*b* and the right audio data 1231*a* and 1231*b* are compressed in a block truncation coding (BTC) 1240 and then transmitted to an external electronic device. According to an embodiment, the CODEC 1220 may be included within the BTC 1240.

According to an embodiment, the CODEC 1220 may generate two different types of audio encoded data 1221*a* and 1221*b* and 1231*a* and 1231*b* from one audio source 1210.

Figure 12D:
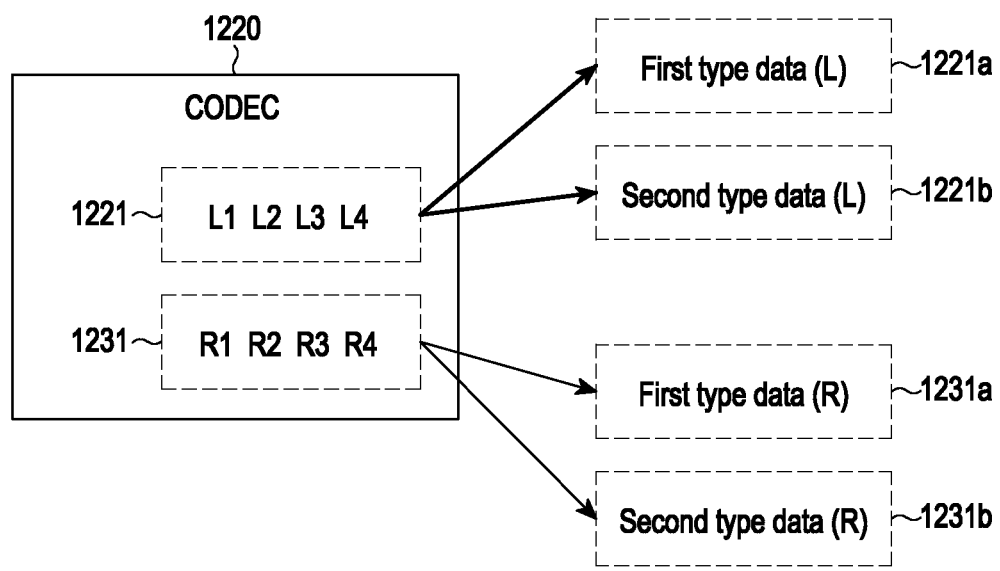

Referring to FIG. 12D, according to an embodiment, upon generating two different types of audio encoded packets from one audio data, a CODEC 1220 may divide audio data 1211 into left audio data 1221 and right audio data 1231. The CODEC 1220 may encode the left audio data 1221 to generate a first type of data (L) 1221*a* and a second type of data (L) 1221*b*. The CODEC 1220 may encode the right audio data 1231 to generate a first type of data (R) 1231*a* and a second type of data (R) 1231*b*. In an embodiment, the first type of data (L) 1221*a* and the first type of data (R) 1231*a*, and the second type of data (L) 1221*b* and the second type of data (R) 1231*b* may be configured as shown in [Table 1] and [Table 2], respectively.

Figure 12E:
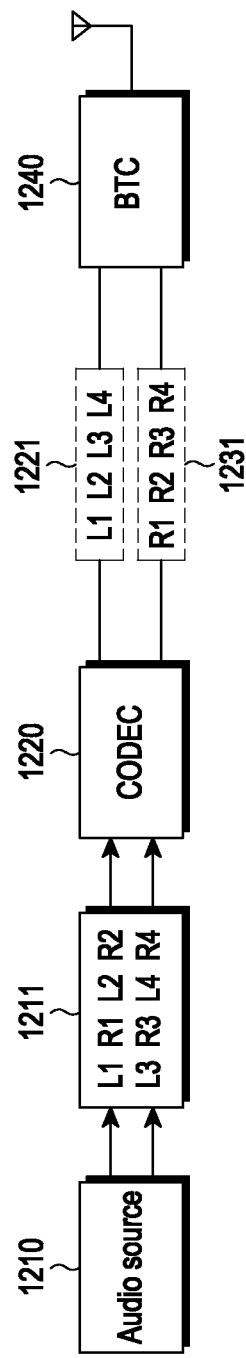

Referring to FIG. 12E, an audio source 1210 consists of audio data 1211 in which left audio data and right audio data are mixed, and the audio data 1211 is encoded into left audio data 1221 and right audio data 1231 while passing through a CODEC 1220, and then the left audio data 1221 and the right audio data 1231 are encoded in block truncation coding (BTC) 1240 to be transmitted to an external electronic device.

Figure 12F:
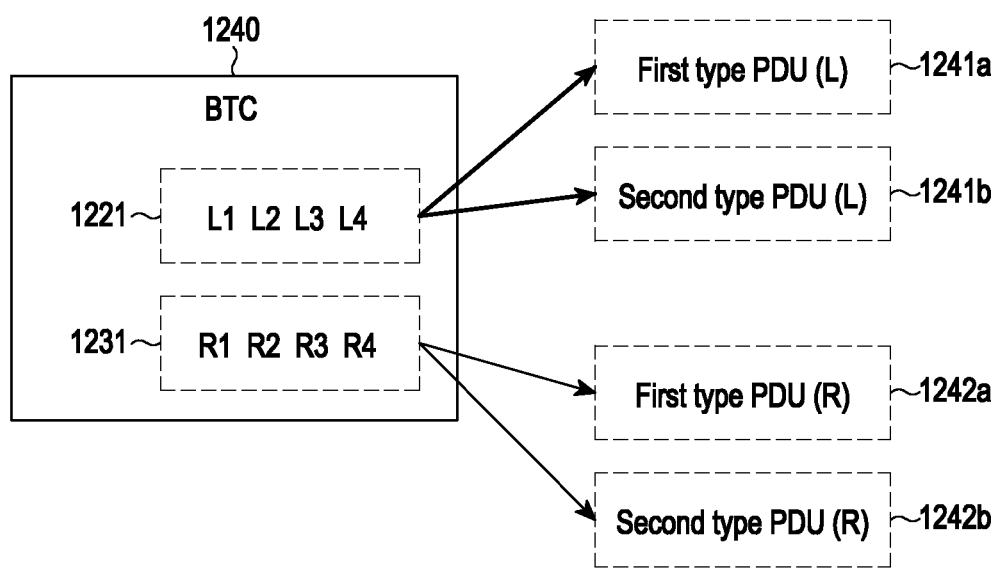

Referring to FIG. 12F, according to an embodiment, a BTC 1240 may generate two different types of PDUs 1241*a* and 1241*b*, and 1242*a* and 1242*b* from one audio encoded data 1221 and 1231.

According to an embodiment, if the BTC 1240 generates two different types of audio encoded data 1241*a* and 1241*b*, and 1242*a* and 1242*b* from the one audio encoded data 1221 and 1231, the BTC 1240 may generate a first type PDU (L) 1241*a* and a second type PDU (L) 1241*b* from left audio data 1221. The BTC 1240 may generate a first type PDU (R) 1242*a* and a second type PDU (R) 1242*b* from right audio data 1231. For example, in an embodiment, the first type data (L) 1241*a* and the first type data (R) 1242*a*, and the second type data (L) 1241*b* and the second type data (R) 1242*b* may be configured as shown in [Table 1] and [Table 2], respectively.

As such, when the electronic device configures the first type data (L) 1241*a* and the first type data (R) 1242*a*, and the second type data (L) 1241*b* and the second type data (R) 1242*b* differently from each other to transmit the first type data (L) 1241*a* and the first type data (R) 1242*a*, and the second type data (L) 1241*b* and the second type data (R) 1242*b*, an external electronic device may recover data using the second type data (L) 1241*b* and the second type data (R) 1242*b* which are successfully received even though the first type data (L) 1241*a* and the first type data (R) 1242*a* are not received.

Figure 13A:
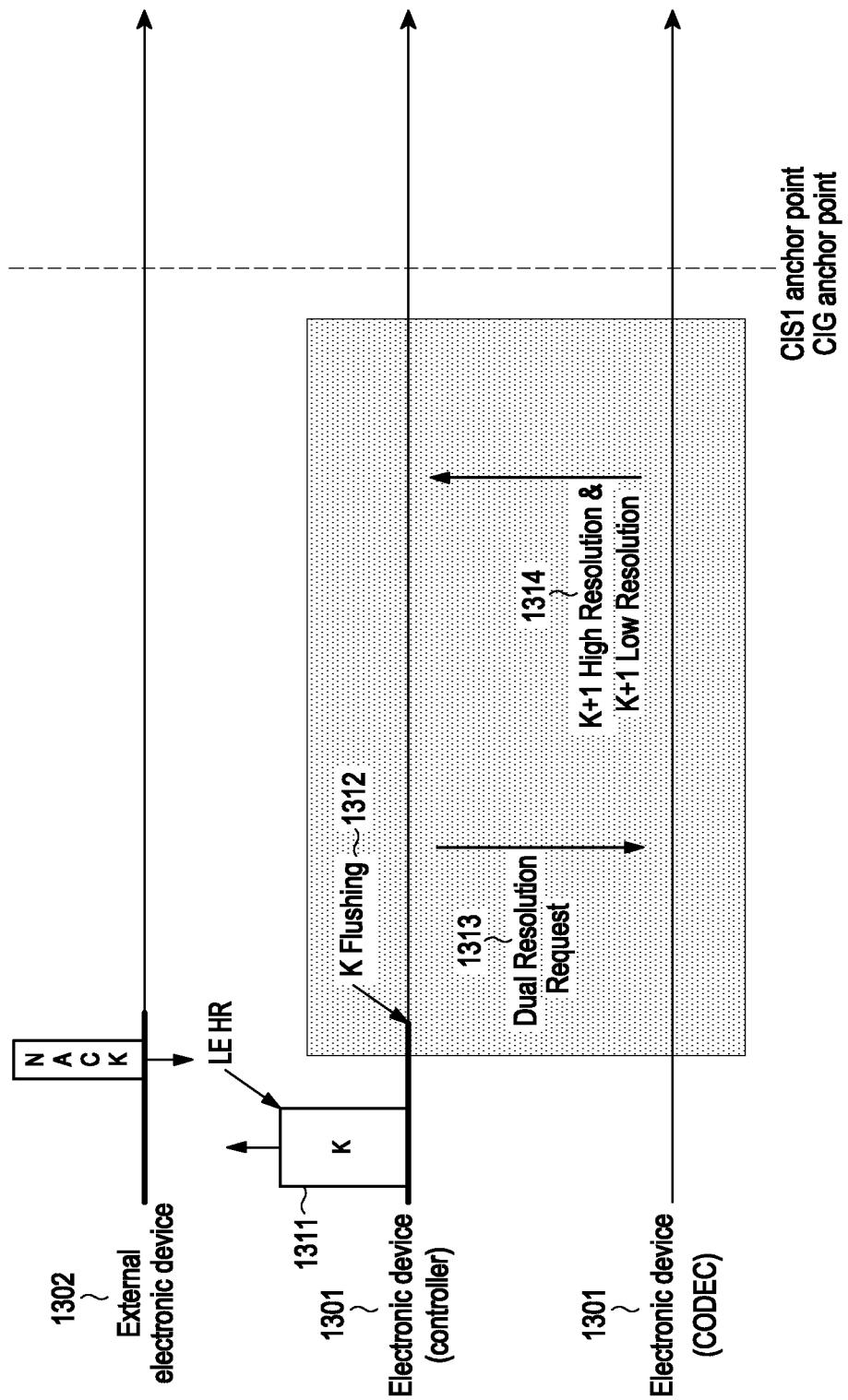
FIGS. 13A and 13B are diagrams for describing an operation in which an electronic device generates two or more encoded data packets upon satisfying a predetermined criterion according to various embodiments.
Figure 13B:
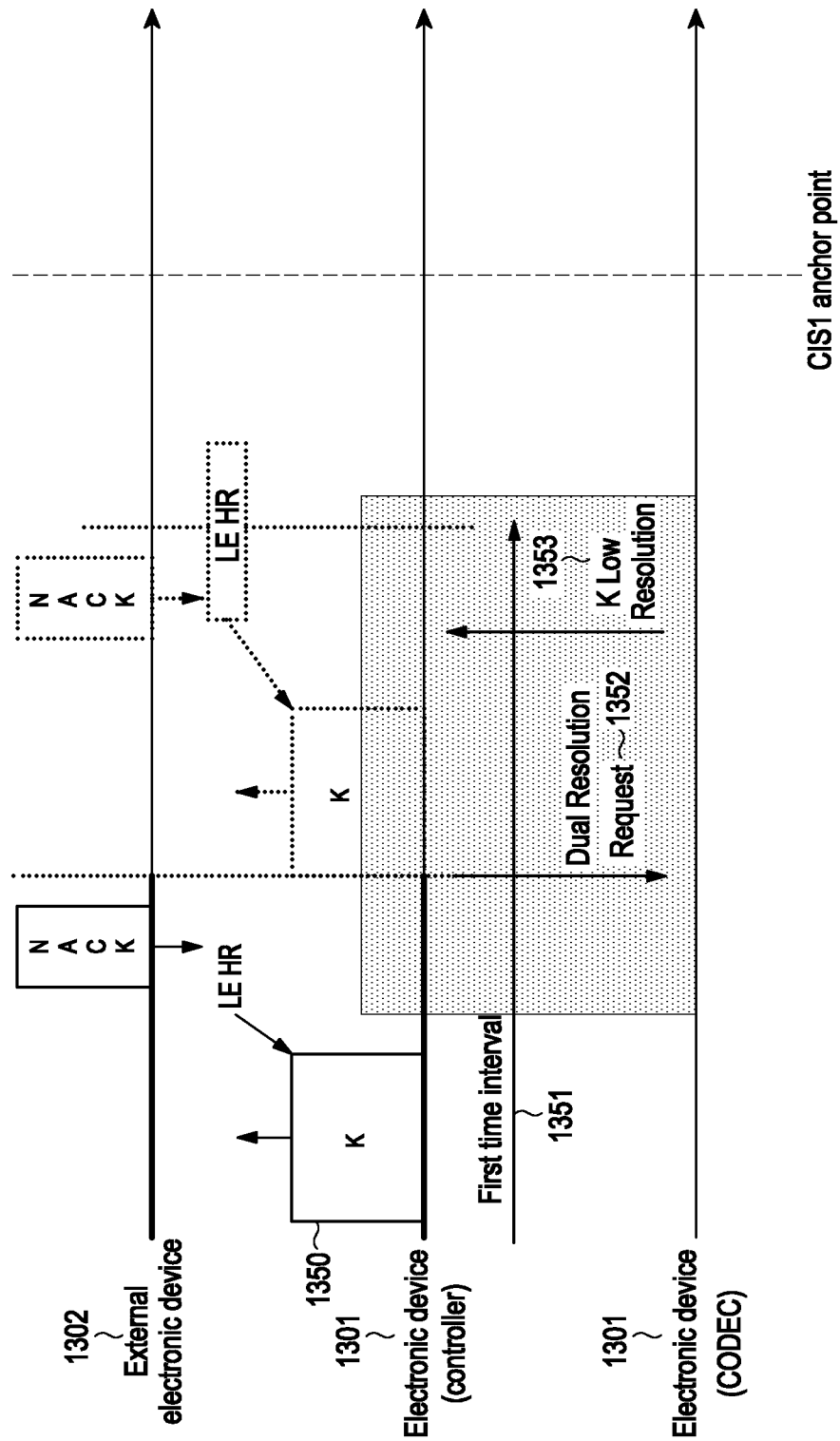

FIGS. 13A and 13B are diagrams for describing an operation in which an electronic device generates two or more encoded data packets upon satisfying a predetermined criterion according to various embodiments.

Referring to FIG. 13A, if a data packet 1311 having a specific SN (e.g., K) is not transmitted normally and is flushed according to an FT value 1312, a controller in an electronic device 1301 may request 1313, from a CODEC, to generate two or more encoded data packets, and the CODEC may generate 1314 two or more encoded data packets for data packets having SNs as many as a predetermined number of a data packet (e.g., K+1) after a corresponding SN.

Referring to FIG. 13B, if a controller in an electronic device determines that one data packet (e.g., K) 1350 is not transmitted normally until a predetermined time point before a life cycle 1351 of the one data packet 1350 expires, the controller may request 1352, from a CODEC, to generate two or more encoded data packets, and the CODEC may generate 1353 a data packet with a low resolution for a corresponding data packet.

Figure 14:
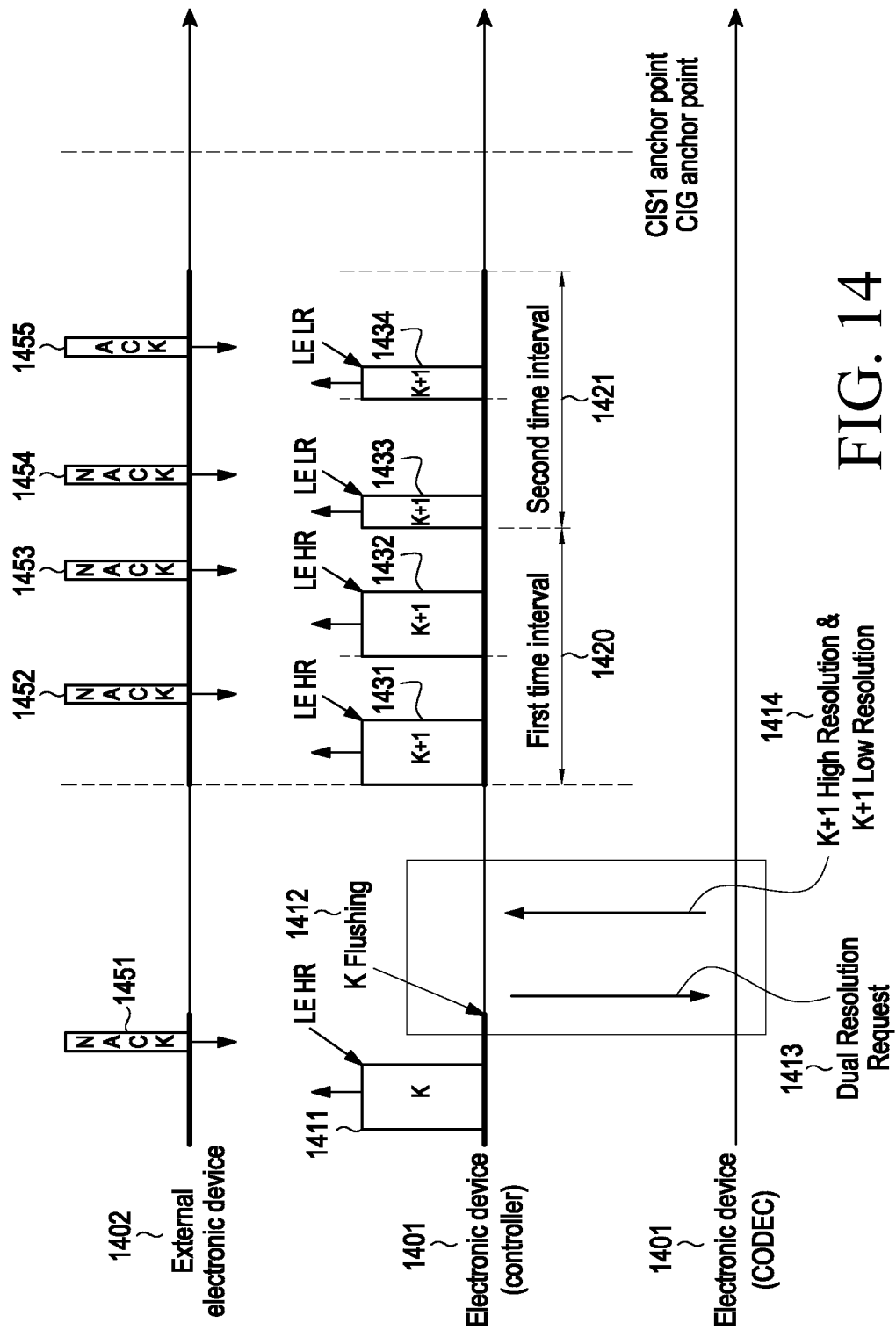
FIG. 14 is a diagram for describing an operation in which an electronic device generates two or more encoded data packets according to various embodiments.

FIG. 14 is a diagram for describing an operation in which an electronic device generates two or more encoded data packets according to various embodiments. A procedure illustrated in an embodiment may correspond to operation 555 to operation 558 in FIG. 5C.

Referring to FIG. 14, if a data packet 1411 having a specific SN (e.g., K) is not transmitted normally (for example, a NACK packet 1451 is received) and is flushed according to an FT value 1412, a controller in an electronic device 1401 may request 1413, from a CODEC, to generate two or more encoded data packets, and the CODEC may generate 1414 two or more encoded data packets for a data packet (e.g., K+1) after a corresponding SN.

Thereafter, the controller in the electronic device 1401 may transmit data packets 1431 and 1432 having a high resolution (e.g., an LE HR) within a predetermined first time interval 1420 and identify whether an ACK packet is received. If a NACK packet thereto is received from an external electronic device 1402 (1452 and 1453), the controller in the electronic device 1401 may transmit data packets 1433 and 1434 having a low resolution (e.g., an LE LR) within a second time interval 1421. According to an embodiment, the electronic device 1401 may receive 1451 a NACK packet for some of the data packets 1433 and 1434 having the low resolution (e.g., the LE LR) and receive 1455 an ACK packet for some of the data packets 1433 and 1434.

Figure 15:
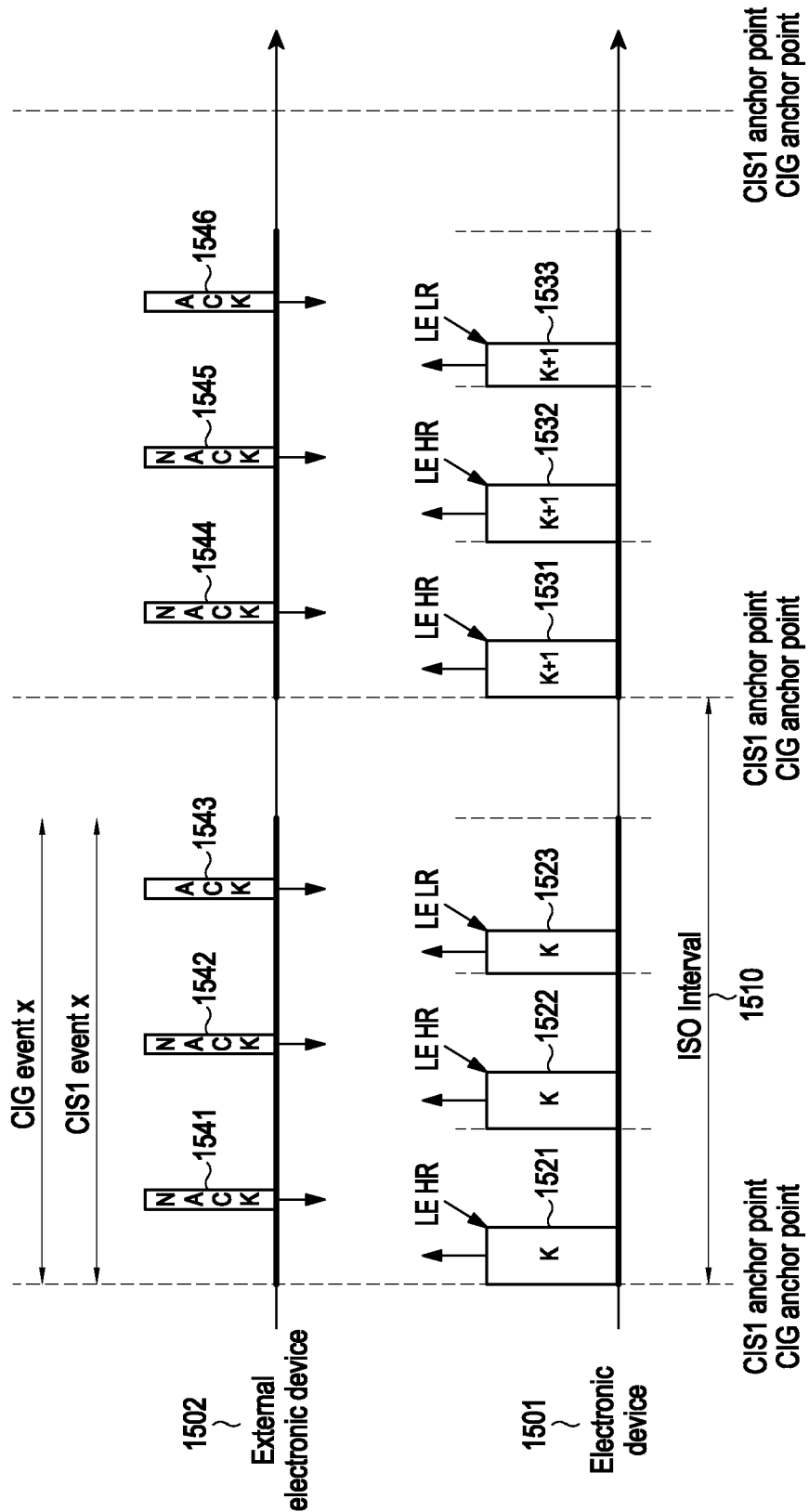
FIG. 15 is a diagram for describing an operation in which an electronic device transmits two or more encoded data packets using a CIS link according to various embodiments.

FIG. 15 is a diagram for describing an operation in which an electronic device transmits two or more encoded data packets using a CIS link according to various embodiments. Here, a CIS link with BN=1, NSE=3, and FT=1 is illustrated. A procedure illustrated in an embodiment may correspond to operation 556 to operation 558 in FIG. 5C.

Referring to FIG. 15, an electronic device 1501 may transmit, according to NSE=3, data packets 1521, 1522, and 1523 having the same SN=K in three CIS subevents, respectively within an ISO interval 1510 (e.g., a CIS 1 event x in a CIG event x) for a CIS link between the electronic device 1501 and an external electronic device 1502. According to an embodiment, the electronic device 1501 may transmit data packets 1521 and 1522 having a high resolution (e.g., an LE HR), and if NACK packets 1541 and 1542 are received for the data packets 1521 and 1522, the electronic device 1501 may transmit the data packet 1523 having a low resolution (e.g., an LE LR).

If an ACK packet 1543 to the data packet 1523 is received, the electronic device 1501 may start transmitting a new data packet of SN=K+1 in the next ISO interval. According to an embodiment, in the next ISO interval as in the same manner in the previous ISO interval 1510, the electronic device 1501 may transmit data packets 1531 and 1532 having a high resolution (e.g., an LE HR), and if NACK packets 1544 and 1545 are received for the data packets 1531 and 1532, the electronic device 1501 may transmit a data packet 1533 having a low resolution (e.g., an LE LR). Thereafter, if an ACK packet 1546 to the data packet 1533 is received, the electronic device 1501 may start transmitting a new data packet of SN=K+2 in the next ISO interval.

Figure 16:
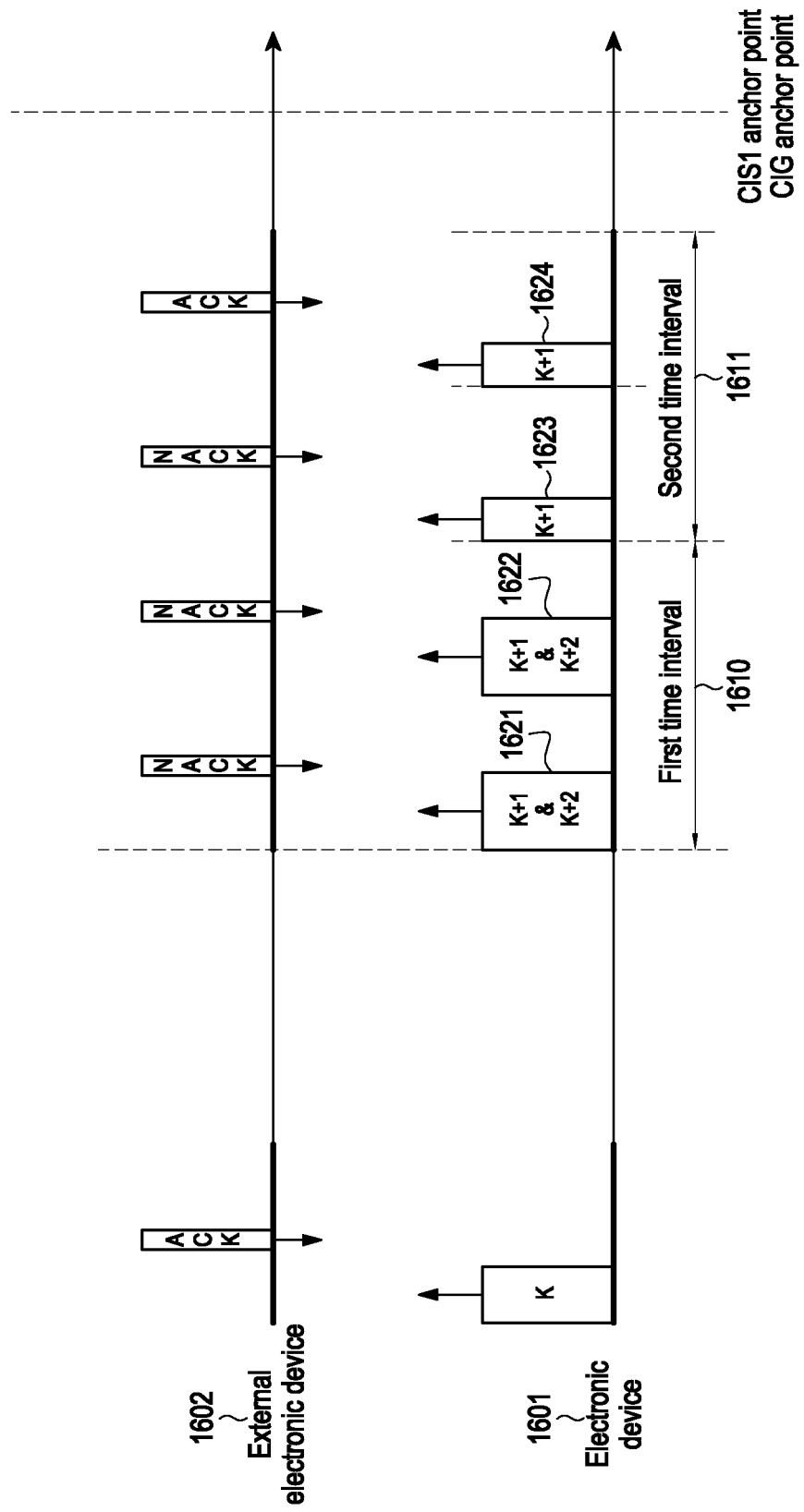
FIG. 16 is a diagram for describing an operation in which an electronic device packs and transmits two or more encoded data packets according to various embodiments.

FIG. 16 is a diagram for describing an operation in which an electronic device packs and transmits two or more encoded data packets according to various embodiments. A procedure illustrated in an embodiment may correspond to an operation 556 to an operation 558 in FIG. 5C.

Referring to FIG. 16, if an ACK packet is received from an external electronic device 1602 as a data packet having a specific SN (e.g., K) is normally transmitted, an electronic device 1601 may pack two or more data packets (e.g., K+1 and K+2) after a corresponding SN into one PDU to transmit (1621, 1622) the one PDU and identify whether an ACK packet is received within a predetermined first time interval 1610. If a NACK packet thereto is received from the external electronic device 1602, the electronic device 1601 may unpack the two or more data packets (e.g., K+1 and K+2) after the SN, and transmit (1623, 1624) one data packet (e.g., K+1) within a second time interval 1611.

Figure 17:
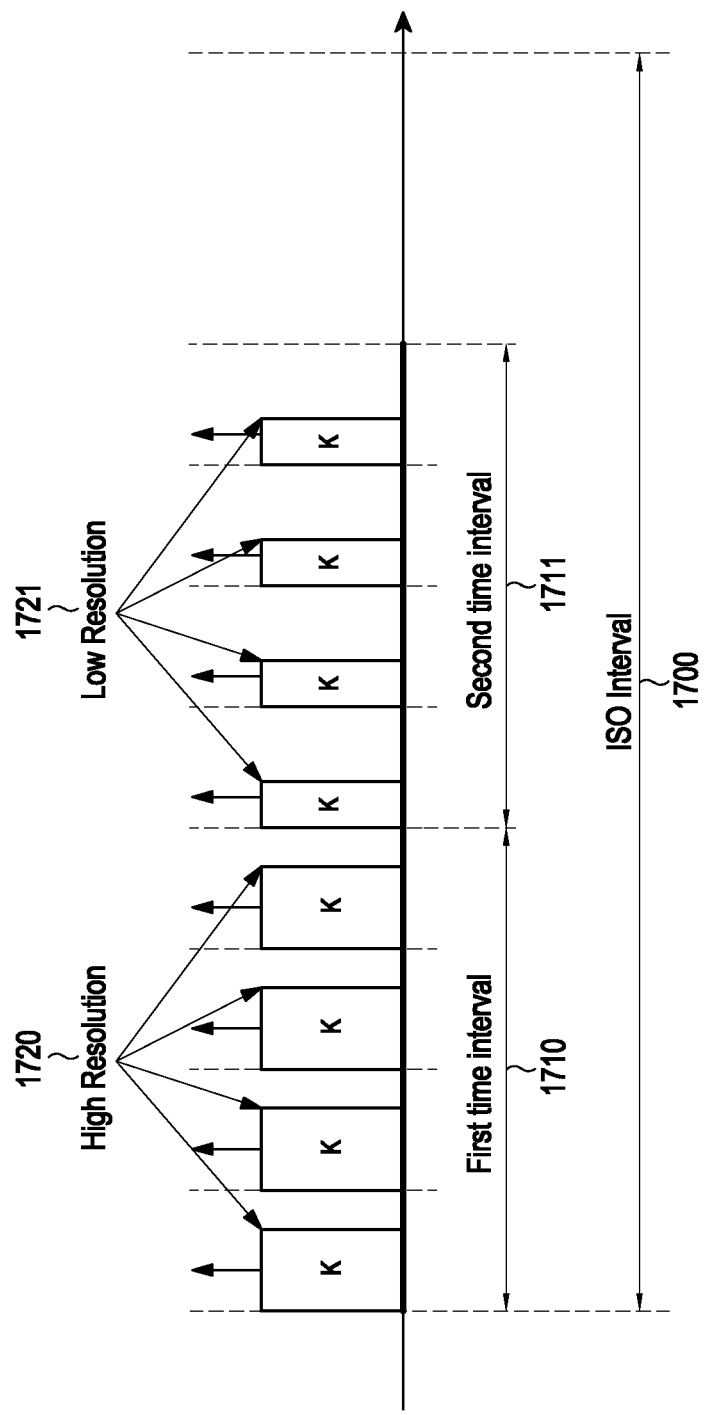
FIG. 17 is a diagram for describing an operation in which an electronic device transmits an encoded data packet using a BIG/BISes link according to various embodiments.

FIG. 17 is a diagram for describing an operation in which an electronic device transmits an encoded data packet using a broadcast isochronous group (BIG)/broadcast isochronous stream (BISes) link according to various embodiments.

In a case of a broadcast service, data may be streamed from a single source device to a plurality of sink terminals using a synchronized stream group, and at this time, each stream is called a BIS, and a group of BISes is called a BIG.

Referring to FIG. 17, an electronic device may perform an audio service using a BIG/BISes link. In a BIS service, a source device repeatedly transmits a packet without receiving an ACK packet from a sink terminal, so it is difficult to secure a service quality. In this case, the electronic device may improve the service quality by transmitting data packets to which two or more different coding schemes are applied in two or more time intervals. According to an embodiment, if BN=1, immediate repetition count (IRC)=88, and NSE=8 are set, even in a situation where it is difficult to receive a high-resolution data packet due to a change in a wireless environment, a low-resolution data packet may be received by transmitting a data packet of a specific SN (e.g., K) having a high resolution 1720 four times in a first time interval 1710 of an ISO interval 1700 and transmitting a data packet of an SN=K having a low resolution 1721 four times in a second time interval 1711 of the ISO interval 1700.

Figure 18:
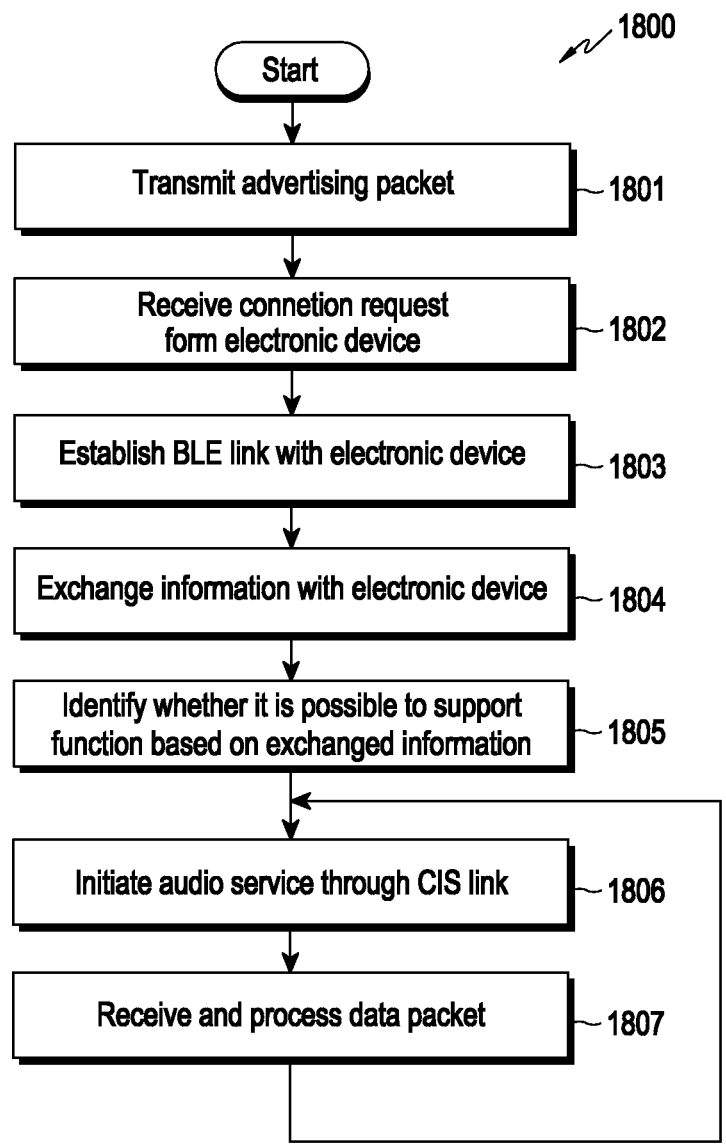
FIG. 18 is a flowchart illustrating an operation in which an external electronic device receives a data packet from an electronic device according to various embodiments.

FIG. 18 is a flowchart 1800 illustrating an operation in which an external electronic device receives a data packet from an electronic device according to various embodiments.

Referring to FIG. 18, an external electronic device may transmit an advertising packet to an electronic device using a BLE communication technology in operation 1801. The external electronic device may receive a connection request from the electronic device in operation 1802. The external electronic device may generate a BLE link with the electronic device in operation 1803. According to an embodiment, a detailed operation in which the external electronic device generates the BLE link with the electronic device may be the same as that of FIG. 6, and a redundant description will be omitted herein.

In operation 1805, the external electronic device which has generated the BLE link with the electronic device may exchange pieces of information for a BLE communication with the electronic device through a control packet of a link layer. The external electronic device may identify functions of the electronic device based on exchanged information in operation 1805.

According to an embodiment, the exchanged information may include version information and feature information. The version information may include a Bluetooth™ core specification version, a chipset manufacturing vendor identifier (vendor ID), and a sub version. The feature information may include AoBLE support information. According to an embodiment, the external electronic device and the electronic device may also check whether a coding scheme change function is supported with each other. For example, the external electronic device may know that the electronic device supports a coding scheme change function by combining pieces of information included in the version information exchanged with the electronic device. For another example, the external electronic device may know that the electronic device supports the coding scheme change function using a specific link layer control packet, not a standard link layer control packet. For still another example, the external electronic device may know that the electronic device supports the coding scheme change function by exchanging separate data mutually promised for checking whether the coding scheme change function is supported with the electronic device. For still another example, the external electronic device may identify whether a corresponding function is supported without exchanging separate information with the electronic device by checking a device name or a model name (model pet name), and/or the like. According to an embodiment, a detailed operation in which the external electronic device exchanges the feature information with the electronic device and checking whether it is possible to support the coding scheme change function with the electronic device may be the same as in FIGS. 8 and/or 9, and a redundant description will be omitted herein.

The external electronic device, which identifies whether the electronic device may be support the function, may initiate an audio service through the BLE link in operation 1806. The external electronic device may receive a data packet from the electronic device and process the received data packet in operation 1807. According to an embodiment, the external electronic device may perform the audio service through an AoBLE CIS link in consideration of the electronic device providing a plurality of TWS devices with the audio service. According to an embodiment, a procedure for the external electronic device to start the audio service through the CIS link may be the same as that of FIG. 10, a procedure for receiving the data packet from the electronic device may be the same as any one of FIGS. 13 to 16, and a redundant description is omitted herein.

Figure 19A:
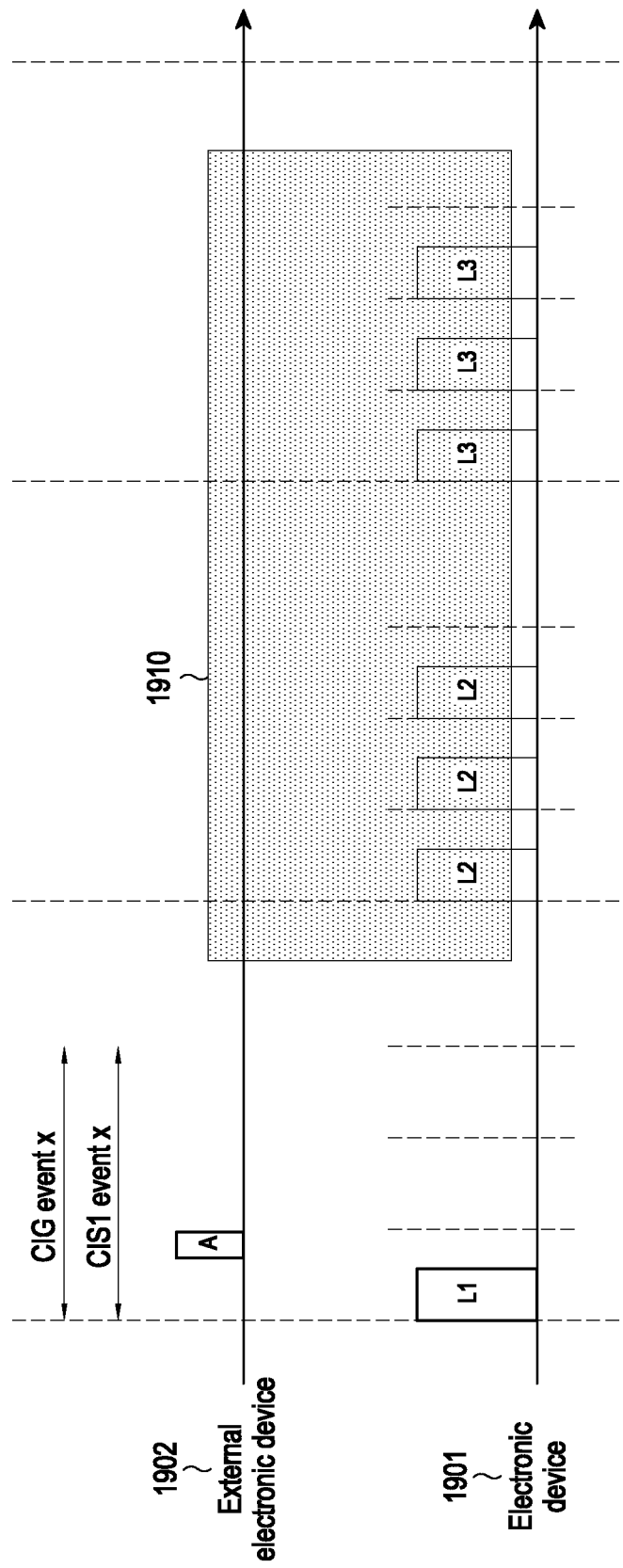
FIG. 19A is a diagram illustrating a transmission failure according to a conventional data packet transmission scheme in a case that interference occurs in a wireless environment.
Figure 19B:
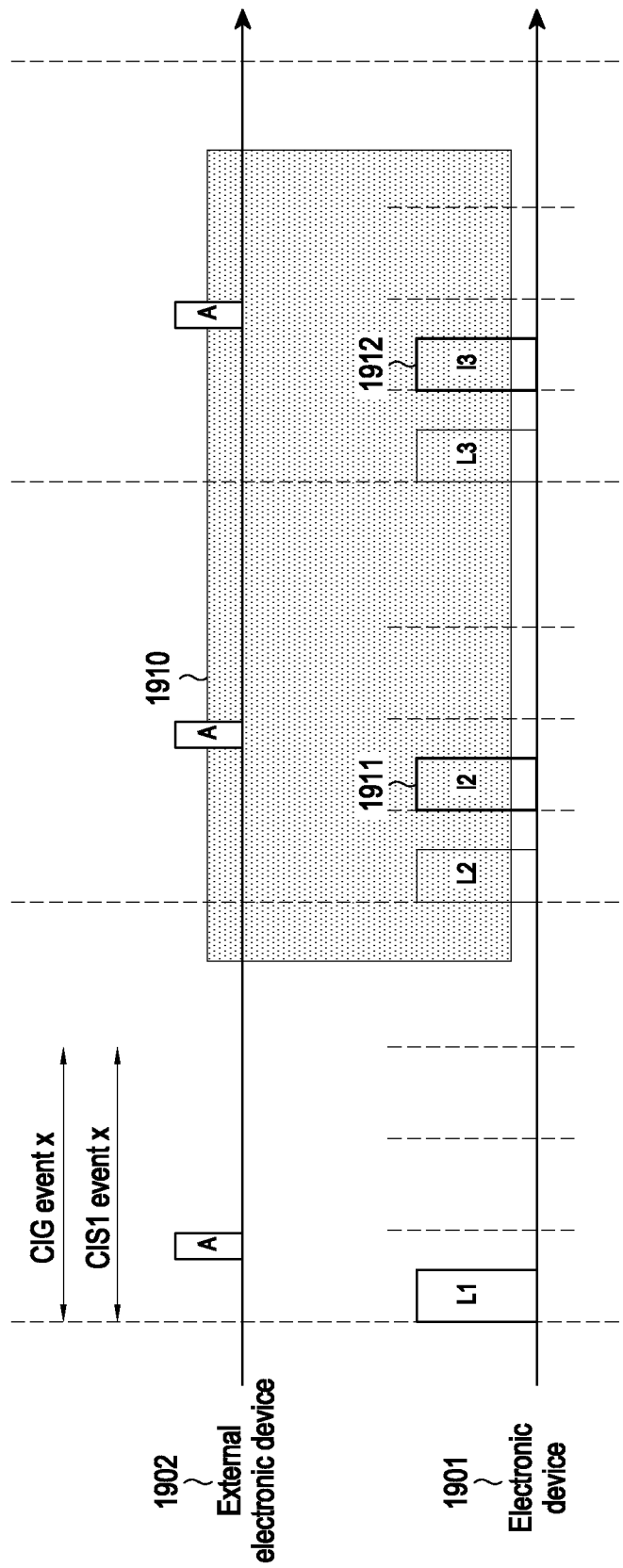
FIG. 19B is a diagram illustrating an example in which data packet transmission is successful according to a data packet transmission scheme according to various embodiments in a case that interference occurs in a wireless environment.

FIG. 19A is a diagram illustrating a transmission failure according to a conventional data packet transmission scheme in a case that interference occurs in a wireless environment, and FIG. 19B is a diagram illustrating an example in which data packet transmission is successful according to a data packet transmission scheme according to various embodiments in a case that interference occurs in a wireless environment.

Referring to FIG. 19A, after successfully transmitting a data packet L1, an electronic device 1901 may transmit data packets L2 and L3 having the same resolution as the data packet L1. Interference may occur (1910) depending on a surrounding network environment while transmitting the data packets L2 and L3, and according to a conventional technology, the electronic device 1901 may transmit only data packets having the same resolution in one transmission interval. Accordingly, a case may occur that an external electronic device 1902 does not receive the data packets L2 and L3, and the electronic device 1901 does not receive an ACK packet to the data packets L2 and L3 from the external electronic device 1902.

Referring to FIG. 19B, according to an embodiment, an electronic device 1901 may transmit a data packet L2 having the same resolution as a data packet L1 after successfully transmitting the data packet L1. Interference may occur (1910) while transmitting the data packet L2 depending on a surrounding network environment, and the electronic device 1901 may not receive an ACK packet to the data packet L2 from the external electronic device 1902. In this case, the electronic device 1901 may receive an ACK packet to a data packet 12 from the external electronic device 1902 by transmitting the data packet 12 having a lower resolution than the data packet L2 according to an embodiment. According to an embodiment, the electronic device 1901 may transmit a data packet L3 having the same resolution as the data packet L1 in the next transmission interval, and depending on a situation in which the interference still occurs, the electronic device 1901 may not receive an ACK packet to the data packet L3 from the electronic device 1902. In this case, the electronic device 1901 may receive an ACK packet to a data packet 13 from the external electronic device 1902 by transmitting the data packet 13 having a lower resolution than the data packet L3.

Figure 20A:
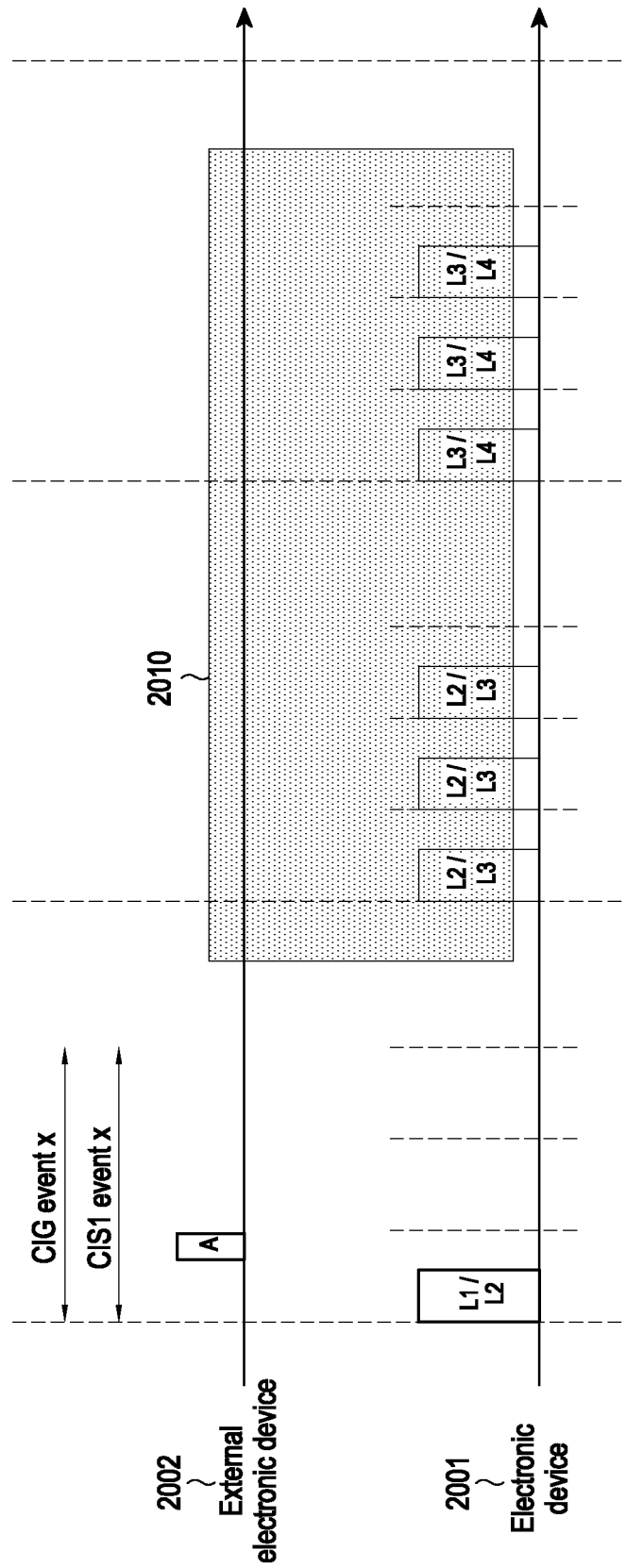
FIG. 20A is a diagram illustrating a transmission failure according to a conventional data packet transmission scheme in a case that interference occurs in a wireless environment.
Figure 20B:
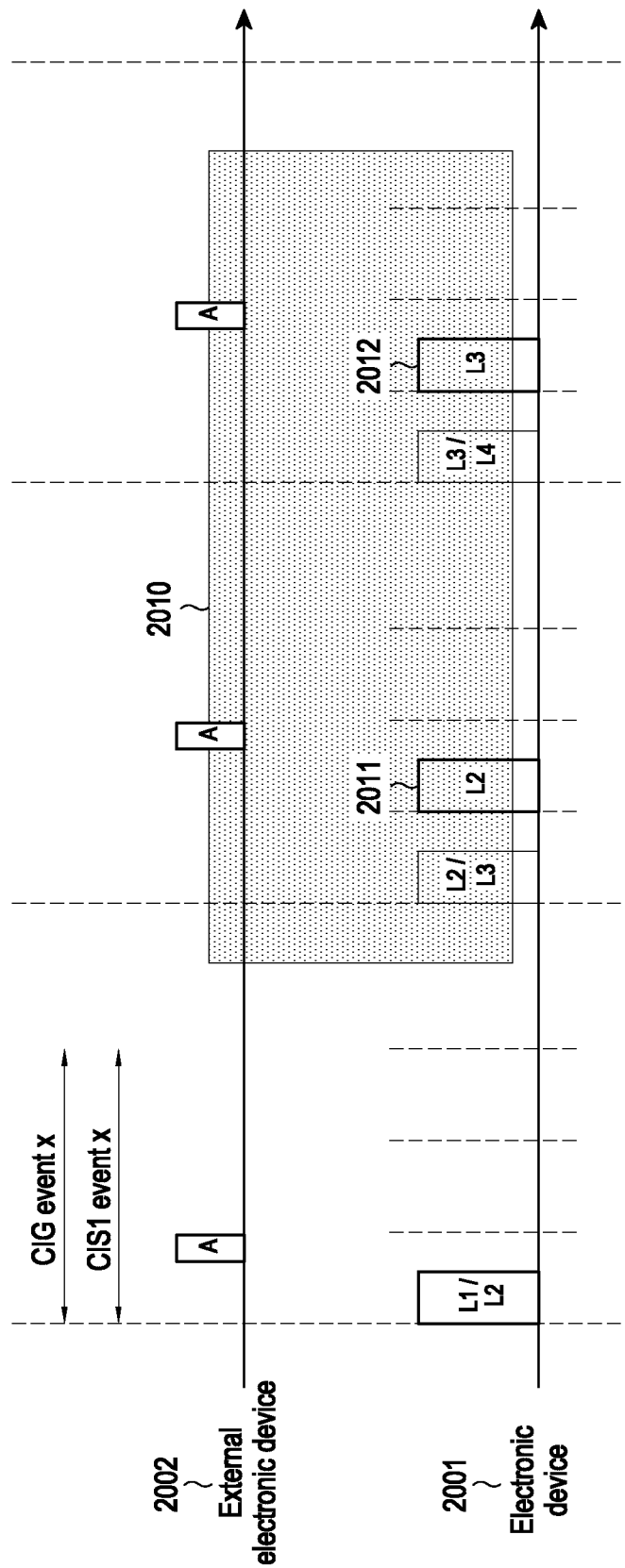
FIG. 20B is a diagram illustrating an example in which data packet transmission is successful according to a transmission scheme for data packets according to various embodiments in a case that interference occurs in a wireless environment.

FIG. 20A is a diagram illustrating a transmission failure according to a conventional data packet transmission scheme in a case that interference occurs in a wireless environment, and FIG. 20B is a diagram illustrating an example in which data packet transmission is successful according to a transmission scheme for data packets according to various embodiments in a case that interference occurs in a wireless environment.

Referring to FIG. 20A, after transmitting data packets L1/L2 of a stacked structure, an electronic device 2001 may receive an ACK packet corresponding thereto from an external electronic device 2002. In the next transmission interval, the electronic device 2001 may transmit data packets L2/L3 and L3/L4 of the stacked structure in the same manner as the data packets L1/L2 of the stacked structure. Interference may occur (2010) depending on a surrounding network environment while transmitting the data packets L2/L3 and L3/L4 of the stacked structure, and according to a conventional technology, the electronic device 2001 may transmit only data packets of the same structure in one transmission interval. Accordingly, a case may occur that the external electronic device 2002 may not receive the data packets L2/L3 and L3/L4 of the stacked structure, and the electronic device 2001 may not receive an ACK packet to the data packets L2/L3 and L3/L4 of the stacked structure from the external electronic device 2002.

Referring to FIG. 20B, according to an embodiment, after successfully transmitting data packets L1/L2 of a stacked structure, an electronic device 2001 may transmit data packets L2/L3 of the stacked structure in the same manner as the data packets L1/L2 of the stacked structure. Interference may occur (2010) depending on a surrounding network environment while transmitting the data packets L2/L3 of the stacked structure, and the electronic device 2001 may not receive an ACK packet to the data packets L2/L3 of the stacked structure from an external electronic device 2002. In this case, the electronic device 2001 may receive an ACK packet to a data packet L2 from the external electronic device 2002 by transmitting the data packet L2 of a single layer structure. According to an embodiment, the electronic device 2001 may transmit data packets L3/L4 of the stacked structure in the next transmission interval, and depending on a situation in which interference still occurs, the electronic device 2001 may not receive an ACK packet to the data packets L3/L4 of the stacked structure from the external electronic device 2002. In this case, the electronic device 2001 may receive an ACK packet to a data packet L3 from the external electronic device 2002 by transmitting the data packet L3 of the single layer structure.

According to various embodiments as described above, an electronic device adaptively transmits data packets encoded in two or more schemes in one transmission interval, thereby increasing a data packet transmission success rate in a wireless environment in which interference occurs.

Figure 21A:
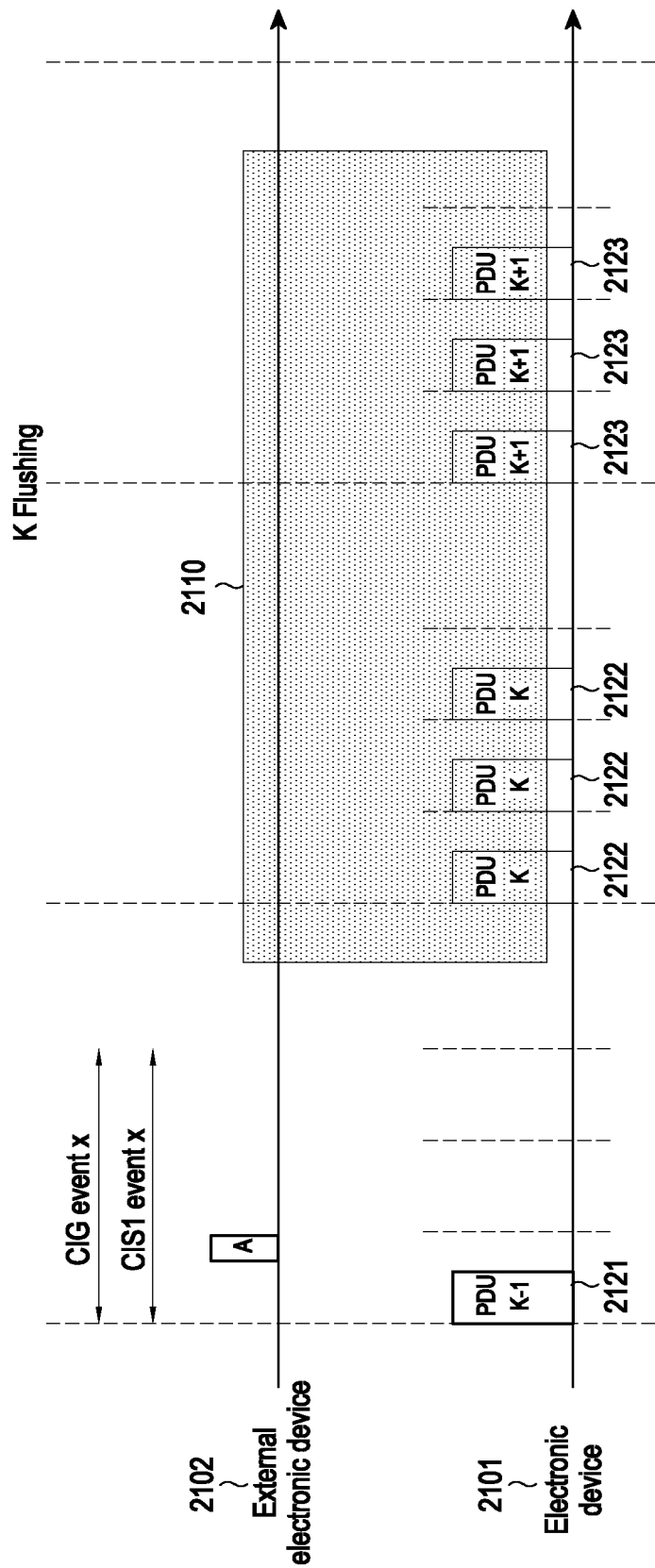
FIG. 21A is a diagram illustrating a transmission failure according to a conventional data packet transmission scheme in a case that interference occurs in a wireless environment.
Figure 21B:
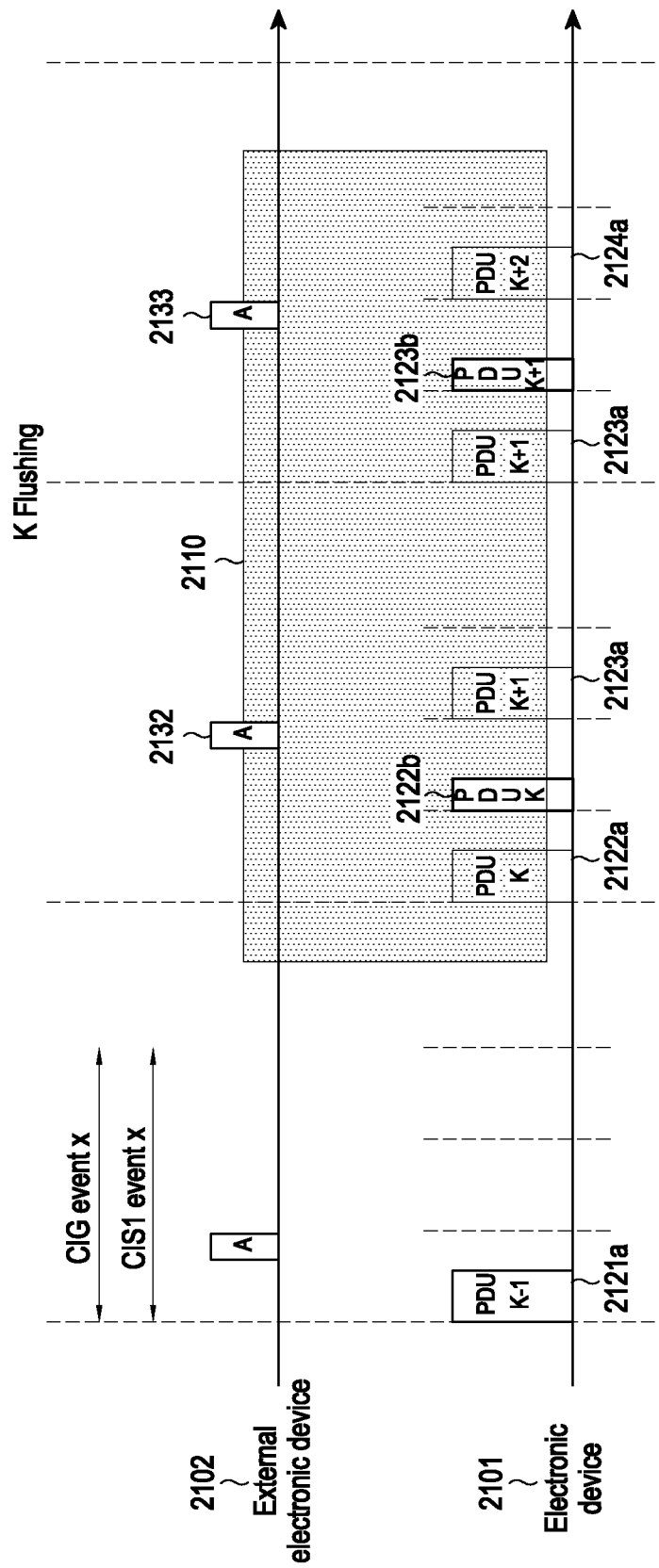
FIG. 21B is a diagram illustrating an example in which data packet transmission is successful according to a transmission scheme for data packets according to various embodiments in a case that interference occurs in a wireless environment.

FIG. 21A is a diagram illustrating a transmission failure according to a conventional data packet transmission scheme in a case that interference occurs in a wireless environment, and FIG. 21B is a diagram illustrating an example in which data packet transmission is successful according to a transmission scheme for data packets according to various embodiments in a case that interference occurs in a wireless environment.

Referring to FIG. 21A, after successfully transmitting a data packet (PDU K−1) 2121, an electronic device 2001 may transmit a data packet (PDU K) 2122 and a data packet (PDU K+1) 2123. Interference 2110 may occur depending on a surrounding network environment while transmitting a first type of data packet (PDU K) 2122 and a first type of data packet (PDU K+1) 2123, and according to a conventional technology, the electronic device 2101 may transmit only the same type of data packets (e.g., the first type of data packets) 2122 and 2123 in one transmission interval. Accordingly, a situation may occur that an external electronic device 2102 may not receive the data packet (PDU K) 2122 and the data packet (PDU K+1) 2123, and the electronic device 2101 may not receive an ACK packet to the data packet (PDU K) 2122 and the data packet (PDU K+1) 2123 from the external electronic device 2102.

Referring to FIG. 21B, according to an embodiment, after successfully transmitting a first type of data packet (PDU K−1) 2121a, an electronic device 2101 may transmit a first type of data packet (PDU K) 2122a whose type is the same as the data packet (PDU K−1) 2121a. Interference 2110 may occur depending on a surrounding network environment while transmitting the first type of data packet (PDU K) 2122a, and the electronic device 2101 may not receive an ACK packet to the first type of data packet (PDU K) 2122a from an external electronic device 2102. In this case, according to an embodiment, the electronic device 2101 may transmit a second type of data packet (PDU K) 2122b having transmission time shorter than that of the first type of data packet (PDU K) 2122a, thereby receiving an ACK packet 2132 to the second type of data packet (PDU K) 2122b from the external electronic device 2102. Upon receiving the ACK packet 2132 to the second type of data packet (PDU K) 2122b, the electronic device 2101 may transmit a first type of data packet (PDU K+1) 2123a before an emission time point (K Flushing) for the data packet (PDU K). In an embodiment, depending on a situation in which interference still occurs, the electronic device 2101 may not receive an ACK packet to the first type of data packet (PDU K+1) 2123a from the external electronic device 2102. In this case, the electronic device 2101 may transmit a second type of data packet (PDU K+1) 2123b, thereby receiving an ACK packet 2133 to the second type of data packet (PDU K+1) 2123b from the external electronic device 2102. According to an embodiment, the electronic device 2101 may transmit a first type of data packet (PDU K+2) 2124a before an emission time point for the data packet (PDU K+1).

In an embodiment, a first type of data packet and a second type of data packet may be configured as shown in [Table 1] and [Table 2], respectively. For example, first type of data packets 2121a, 2122a, 2123a, and 2124a may be configured to include a payload as shown in [Table 1], and second type of data packets 2122b and 2123b may be configured not to include the payload as shown in [Table 2].

According to various embodiments as described above, an electronic device transmits two or more different types of data packets in one transmission interval, thereby increasing a data packet transmission success rate in a wireless environment in which interference occurs and additionally securing a transmission opportunity for a next data packet.

According to various embodiments, an operating method in an electronic device (e.g., an electronic device 101 such as a smart phone) includes: establishing, via a communication circuit (e.g., a communication module 410), a Bluetooth™ low energy (BLE) communication link with an external electronic device (e.g., an external electronic device 304 such as wireless earbuds); generating a first data packet from first audio data using a first coding scheme, generating a second data packet from the first audio data using a second coding scheme, and generating a third data packet from second audio data using the first coding scheme; and through the BLE communication link, transmitting the first data packet to the external electronic device in a first time interval of a predetermined time interval, and transmitting the second data packet or the third data packet to the external electronic device in a second time interval of the predetermined time interval.

According to various embodiments, the method may further include: transmitting first feature information to the external electronic device through the BLE communication link, receiving second feature information from the external electronic device through the BLE communication link, where the first feature information may indicate whether the electronic device supports audio over BLE (AoBLE) and/or whether the electronic device supports a coding scheme change function, and where the second feature information may indicate whether the external electronic device supports the AoBLE and/or whether the external electronic device supports the coding scheme change function. the step of transmitting the first data packet and the second data packet to the external electronic device may include: based on identifying that the external electronic device supports the AoBLE and supports the coding scheme change function based on the second feature information, transmitting the first data packet and the second data packet to the external electronic device.

According to various embodiments, transmitting the second data packet to the external electronic device in the second time interval comprises may include, based on receiving, from the external electronic device, a negative acknowledgment (NACK) packet as a response signal to the first data packet during the first time interval or based on not receiving an acknowledgment (ACK) packet during the first time interval, after transmitting the first data packet to the external electronic device, transmitting the second data packet to the external electronic device in the second time interval.

According to various embodiments, transmitting the third data packet to the external electronic device in the second time interval may further include based on receiving, from the external electronic device, an acknowledgement (ACK) packet as a response signal to the first data packet during the first time interval after transmitting the first data packet to the external electronic device, transmitting the third data packet to the external electronic device in the second time interval.

According to various embodiments, transmitting the third data packet to the external electronic device in the second time interval may include, based on receiving, from the external electronic device, an ACK packet as a response signal to the second data packet during the second time interval after transmitting the second data packet to the external electronic device, transmitting the third data packet to the external electronic device in the second time interval.

In the method according to various embodiments, the first data packet and the third data packet may each have a higher resolution than the second data packet.

According to various embodiments, an operating method in an electronic device (e.g., an external electronic device 304 such as wireless earbuds) may include: establishing, via a communication circuit (e.g., a communication module 310), a Bluetooth™ low energy (BLE) communication link with an external electronic device (e.g., an electronic device 101), and through the BLE communication link, receiving a first data packet from the external electronic device in a first time interval of a predetermined time interval, and receiving a second data packet from the external electronic device in a second time interval of the predetermined time interval. The first data packet is generated from first audio data using a first coding scheme, and the second data packet is generated from the first audio data using a second coding scheme.

According to various embodiments, the operating method may further include: receiving first feature information from the external electronic device through the BLE communication link, and transmitting second feature information to the external electronic device through the BLE communication link, where the first feature information may indicate whether the external electronic device supports audio over BLE (AoBLE) and/or whether the external electronic device supports a coding scheme change function, and where the second feature information may indicate whether the electronic device supports the AoBLE and/or whether the electronic device supports the coding scheme change function, and the step of receiving the first data packet and the second data packet from the external electronic device may include: based on identifying that the electronic device supports the AoBLE and supports the coding scheme change function, receiving the first data packet and the second data packet from the external electronic device.

According to various embodiments, receiving the second data packet from the external electronic device in the second time interval may include, based on transmitting, to the external electronic device, a negative acknowledgment (NACK) packet as a response signal to the first data packet during the first time interval after receiving the first data packet from the external electronic device, receiving the second data packet from the external electronic device in the second time interval.

According to various embodiments, the first data packet may have a higher resolution than the second data packet.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a communication circuit configured to support a Bluetooth™ communication; and
at least one processor functionally connected to the communication circuit,
wherein the at least one processor is configured to:
establish, via the communication circuit, a Bluetooth™ low energy (BLE) communication link with an external electronic device,
generate a first data packet from first audio data using a first coding scheme, generate a second data packet from the first audio data using a second coding scheme, and generate a third data packet from second audio data using the first coding scheme, and
through the BLE communication link, transmit the first data packet to the external electronic device in a first time interval of a predetermined time interval, and transmit the second data packet or the third data packet to the external electronic device in a second time interval of the predetermined time interval.

2. The electronic device of claim 1, wherein the at least one processor is further configured to:
transmit first feature information to the external electronic device through the BLE communication link, wherein the first feature information indicates whether the electronic device supports audio over BLE (AoBLE) and/or whether the electronic device supports a coding scheme change function, and
receive second feature information from the external electronic device through the BLE communication link, wherein the second feature information indicates whether the external electronic device supports the AoBLE and/or whether the external electronic device supports the coding scheme change function, and
wherein, based on identifying that the external electronic device supports the AoBLE and supports the coding scheme change function using the second feature information, the at least one processor transmits the first data packet and the second data packet to the external electronic device.

3. The electronic device of claim 1, wherein, based on receiving, from the external electronic device, a negative acknowledgment (NACK) packet as a response signal to the first data packet during the first time interval or based on not receiving an acknowledgment (ACK) packet during the first time interval, after transmitting the first data packet to the external electronic device, the at least one processor transmits the second data packet to the external electronic device in the second time interval.

4. The electronic device of claim 1, wherein,
based on receiving, from the external electronic device, an acknowledgement (ACK) packet as a response signal to the first data packet during the first time interval after transmitting the first data packet to the external electronic device, the at least one processor transmits the third data packet to the external electronic device in the second time interval.

5. The electronic device of claim 1, wherein,
based on receiving, from the external electronic device, an acknowledgement (ACK) packet as a response signal to the second data packet during the second time interval after transmitting the second data packet to the external electronic device, the at least one processor transmits the third data packet to the external electronic device in the second time interval.

6. The electronic device of claim 1, wherein the second time interval is after the first time interval, and
wherein the first data packet and the third data packet each have a higher resolution than the second data packet.

7. An electronic device, comprising:
a communication circuit configured to support a Bluetooth™ communication; and
at least one processor functionally connected to the communication circuit,
wherein the at least one processor is configured to:
establish, via the communication circuit, a Bluetooth™ low energy (BLE) communication link with an external electronic device, and
through on the BLE communication link, receive a first data packet from the external electronic device in a first time interval of a predetermined time interval, and receive a second data packet from the external electronic device in a second time interval of the predetermined time interval, and
wherein the first data packet is generated from first audio data using a first coding scheme, and the second data packet is generated from the first audio data using a second coding scheme.

8. The electronic device of claim 7, wherein the at least one processor is further configured to:
receive first feature information from the external electronic device through the BLE communication link, wherein the first feature information indicates whether the external electronic device supports audio over BLE (AoBLE) and/or whether the external electronic device supports a coding scheme change function, and
transmit second feature information to the external electronic device through the BLE communication link, wherein the second feature information indicates whether the electronic device supports the AoBLE and/or whether the electronic device supports the coding scheme change function, and
wherein, based on identifying that the electronic device supports the AoBLE and supports the coding scheme change function, the at least one processor receives the first data packet and the second data packet from the external electronic device.

9. The electronic device of claim 7, wherein,
based on transmitting, to the external electronic device, a negative acknowledgment (NACK) packet as a response signal to the first data packet during the first time interval after receiving the first data packet from the external electronic device, the at least one processor receives the second data packet from the external electronic device in the second time interval.

10. The electronic device of claim 7, wherein the second time interval is after the first time interval, and
wherein the first data packet has a higher resolution than the second data packet.

11. An operating method in an electronic device, the operating method comprising:
establishing, via a communication circuit, a Bluetooth™ low energy (BLE) communication link with an external electronic device;
generating a first data packet from first audio data using a first coding scheme, generating a second data packet from the first audio data using a second coding scheme, and generating a third data packet from second audio data using the first coding scheme; and through on the BLE communication link, transmitting the first data packet to the external electronic device in a first time interval of a predetermined time interval, and transmitting the second data packet or the third data packet to the external electronic device in a second time interval of the predetermined time interval.

12. The operating method of claim 11, further comprising:
transmitting first feature information to the external electronic device through the BLE communication link;
receiving second feature information from the external electronic device through the BLE communication link,
wherein the first feature information indicates whether the electronic device supports audio over BLE (AoBLE) and/or whether the electronic device supports a coding scheme change function, and
wherein the second feature information indicates whether the external electronic device supports the AoBLE and/or whether the external electronic device supports the coding scheme change function; and
wherein transmitting the first data packet and the second data packet to the external electronic device comprises:
based on identifying that the external electronic device supports the AoBLE and supports the coding scheme change function using the second feature information, transmitting the first data packet and the second data packet to the external electronic device.

13. The operating method of claim 11, wherein transmitting the second data packet to the external electronic device in the second time interval comprises:
based on receiving, from the external electronic device, a negative acknowledgment (NACK) packet as a response signal to the first data packet during the first time interval or based on not receiving an acknowledgment (ACK) packet during the first time interval, after transmitting the first data packet to the external electronic device, transmitting the second data packet to the external electronic device in the second time interval.

14. The operating method of claim 11, wherein, transmitting the third data packet to the external electronic device in the second time interval comprises:
based on receiving, from the external electronic device, an acknowledgement (ACK) packet as a response signal to the first data packet during the first time interval after transmitting the first data packet to the external electronic device, transmitting the third data packet to the external electronic device in the second time interval.

15. The operating method of claim 11, wherein transmitting the third data packet to the external electronic device in the second time interval comprises:
based on receiving, from the external electronic device, an acknowledgement (ACK) packet as a response signal to the second data packet during the second time interval after transmitting the second data packet to the external electronic device, transmitting the third data packet to the external electronic device in the second time interval.

16. The operating method of claim 11, wherein the second time interval is after the first time interval, and
wherein the first data packet and the third data packet each have a higher resolution than the second data packet.

17. An operating method in an electronic device, the operating method comprising:
establishing, via a communication circuit, a Bluetooth™ low energy (BLE) communication link with an external electronic device; and
through on the BLE communication link, receiving a first data packet from the external electronic device in a first time interval of a predetermined time interval, and receiving a second data packet from the external electronic device in a second time interval of the predetermined time interval,
wherein the first data packet is generated from first audio data using a first coding scheme, and the second data packet is generated from the first audio data using a second coding scheme.

18. The operating method of claim 17, further comprising:
receiving first feature information from the external electronic device through the BLE communication link; and
transmitting second feature information to the external electronic device through the BLE communication link,
wherein the first feature information indicates whether the external electronic device supports audio over BLE (AoBLE) and/or whether the external electronic device supports a coding scheme change function,
wherein the second feature information indicates whether the electronic device supports the AoBLE and/or whether the electronic device supports the coding scheme change function; and
wherein receiving the first data packet and the second data packet from the external electronic device comprises: based on identifying that the electronic device supports the AoBLE and supports the coding scheme change function, receiving the first data packet and the second data packet from the external electronic device.

19. The operating method of claim 17, wherein receiving the second data packet from the external electronic device in the second time interval comprises:
based on transmitting, to the external electronic device, a negative acknowledgment (NACK) packet as a response signal to the first data packet during the first time interval after receiving the first data packet from the external electronic device, receiving the second data packet from the external electronic device in the second time interval.

20. The operating method of claim 17, wherein the second time interval is after the first time interval, and
wherein the first data packet has a higher resolution than the second data packet.

* * * * *